(12) United States Patent
Kobayashi et al.

(10) Patent No.: US 8,770,005 B2
(45) Date of Patent: Jul. 8, 2014

(54) METHOD OF MANUFACTURING OUTWARDLY FLANGED METAL MEMBER

(75) Inventors: Kazuto Kobayashi, Kanagawa (JP); Hiroshi Koyama, Kanagawa (JP); Yu Yasuda, Kanagawa (JP); Yusuke Haruna, Kanagawa (JP)

(73) Assignee: NSK Ltd., Tokyo (JP)

( * ) Notice: Subject to any disclaimer, the term of this patent is extended or adjusted under 35 U.S.C. 154(b) by 902 days.

(21) Appl. No.: 12/864,980

(22) PCT Filed: Jan. 28, 2009

(86) PCT No.: PCT/JP2009/051380
§ 371 (c)(1),
(2), (4) Date: Nov. 15, 2010

(87) PCT Pub. No.: WO2009/096434
PCT Pub. Date: Aug. 6, 2009

(65) Prior Publication Data
US 2011/0048097 A1 Mar. 3, 2011

(30) Foreign Application Priority Data

Jan. 29, 2008 (JP) ................. P2008-017166
Sep. 2, 2008 (JP) ................. P2008-224385

(51) Int. Cl.
| | | |
|---|---|---|
| *B21D 47/00* | (2006.01) | |
| *B21D 31/00* | (2006.01) | |
| *B60B 27/00* | (2006.01) | |
| *B21J 5/06* | (2006.01) | |
| *F16C 33/64* | (2006.01) | |
| *B21K 23/04* | (2006.01) | |
| *F16C 19/18* | (2006.01) | |
| *B21K 1/40* | (2006.01) | |

(52) U.S. Cl.
CPC ............ *F16C 19/186* (2013.01); *B60B 27/00* (2013.01); *F16C 2326/02* (2013.01); *B21J 5/06* (2013.01); *F16C 33/64* (2013.01); *B21K 23/04* (2013.01); *B21K 1/40* (2013.01)
USPC ................ 72/377; 72/352; 72/358

(58) Field of Classification Search
USPC ............ 72/31.13, 273, 273.5, 276, 278, 282, 72/284, 285, 352, 353.2, 355.2, 355.4, 72/355.6, 358, 360, 384, 386, 416, 463, 72/467, 470, 471, 474, 475, 354.8, 465.1, 72/466.8, 433, 434
See application file for complete search history.

(56) References Cited

U.S. PATENT DOCUMENTS

| | | | | | |
|---|---|---|---|---|---|
| 4,365,499 | A | * | 12/1982 | Hirota et al. ................ | 72/466.9 |
| 5,894,752 | A | * | 4/1999 | Yano et al. .................... | 72/359 |
| 7,481,093 | B2 | * | 1/2009 | Joseph ............................ | 72/430 |
| 8,402,661 | B2 | * | 3/2013 | Kobayashi et al. ...... | 29/898.066 |
| 2009/0293573 | A1 | * | 12/2009 | Matsui ............................ | 72/358 |
| 2010/0018277 | A1 | * | 1/2010 | Hielscher ...................... | 72/352 |

FOREIGN PATENT DOCUMENTS

| | | |
|---|---|---|
| CN | 1760052 A | 4/2006 |
| JP | 3184647 A | 8/1991 |
| JP | 9216033 A | 8/1997 |
| JP | 2005-083513 A | 3/2005 |
| JP | 2005-297885 A | 10/2005 |
| JP | 2006-111070 A | 4/2006 |
| JP | 2006-177466 A | 7/2006 |
| JP | 2007-152413 A | 6/2007 |

OTHER PUBLICATIONS

International Search Report (PCT/ISA/210) issued Apr. 21, 2009 in corresponding PCT/JP2009/051380.
International Preliminary Examination Report (PCT/ISA/237) issued Apr. 21, 2009 in corresponding PCT/JP2009/051380.
Communication dated Oct. 23, 2012 from the Japanese Patent Office in counterpart Japanese application No. 2009-551544.
Communication dated Mar. 27, 2012 issued by the State Intellectual Property Office of the People's Republic of China in corresponding Chinese Application No. 200980103311.8.

* cited by examiner

*Primary Examiner* — Shelley Self
*Assistant Examiner* — Pradeep C Battula
(74) *Attorney, Agent, or Firm* — Sughrue Mion, PLLC

(57) ABSTRACT

There is provided a method of manufacturing an outwardly flanged metal member, by which a metal member having outward flange portions which extend radially outwardly from a plurality of positions along a circumferential direction on an outer peripheral surface can be formed without a flash, or with a reduced amount of a flash. While surrounding a periphery of a metal blank 15 by a stationary die 21 and a movable die 22 and butting a distal face of the movable die 22 and a distal face of the stationary die 21, an axial end face of the blank 15 is plastically deformed by pressing the axial end face with the punch under a warm or hot condition to form the outward flange portions 7a by filling flange molding cavities 32 with a portion of the blank 15.

9 Claims, 25 Drawing Sheets

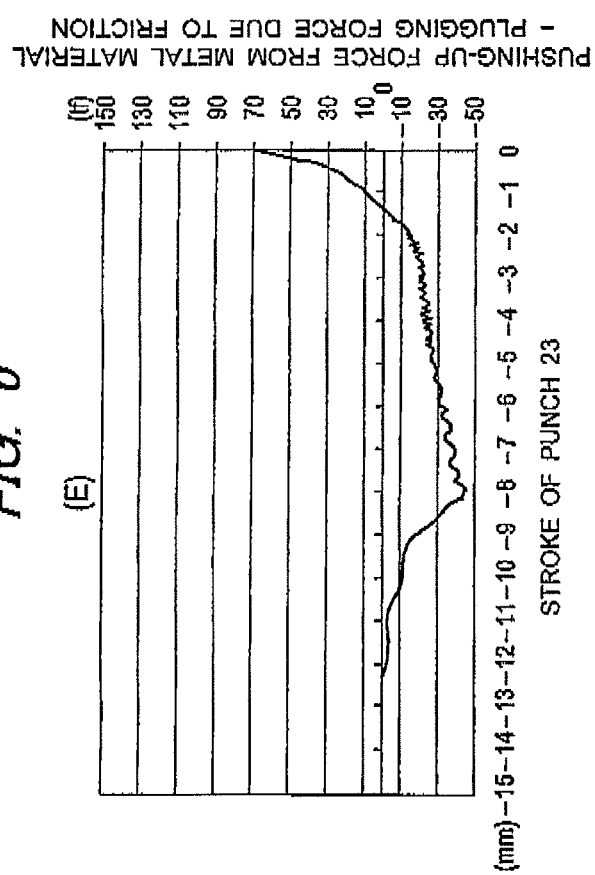
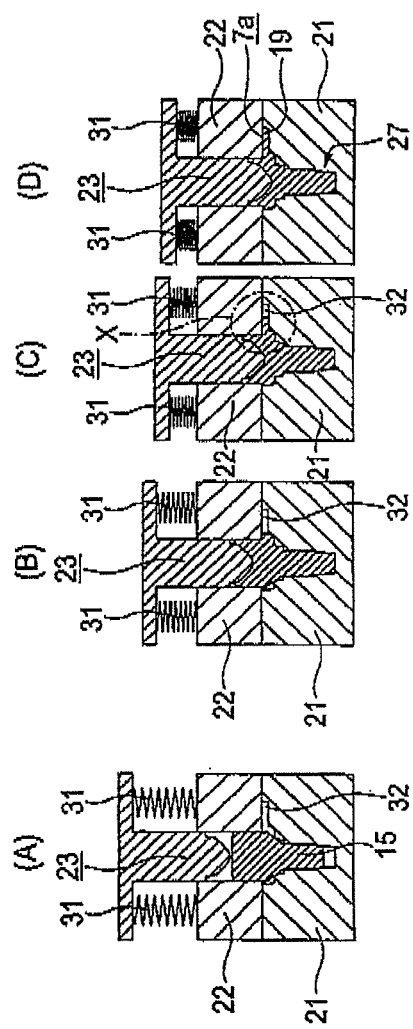
FIG. 6

METHOD OF MANUFACTURING OUTWARDLY FLANGED METAL MEMBER

TECHNICAL FIELD

The present invention relates a method of manufacturing a bearing ring of a wheel support rolling bearing unit, that is, an outwardly flanged metal member such as an outer ring or a hub.

BACKGROUND ART

Wheel support rolling bearing units are used for rotatably supporting a vehicle wheel and a disk or a drum serving as a rotary member for braking on a knuckle serving as a suspension system. FIG. 21 shows an example of a widely known wheel support rolling bearing unit 1 for a driven wheel (in FR and MR vehicles, a front wheel; in an FF vehicle, a rear wheel). In this wheel support rolling bearing unit 1, a hub 3 is rotatably supported in a radially inner side of an outer ring 2 via a plurality of rolling elements 4, 4. When in use, the outer ring 2 is connected and fixed to a knuckle, while a wheel and a braking rotary member are supported on and fixed to the hub 3 respectively. The wheel and the braking rotary member are supported on the knuckle such that they rotatable with respect to the knuckle.

The outer ring 2 includes double-row outer ring raceways 5, 5 which are formed on an inner peripheral surface of the outer ring 2. On an axially inward portion of an outer peripheral surface of the outer ring 2 (throughout the specification, "inward" with respect to the axial direction implies closer toward the widthwise center of a vehicle body when in use, and "outward" with respect to the axial direction implies closer toward the outside the vehicle body in the width direction when in use), a mounting portion 6 is formed as an outward flange portion.

The hub 3 includes double-row inner ring raceways 8, 8 which are formed on an outer peripheral surface of the hub 3. On a portion of the outer peripheral surface of the hub 3 near an outer end that projects outwardly in the axial direction than the outer ring 2, a support flange 7 is formed as an outward flange portion for supporting and fixing the wheel and the braking rotary member. Between the outer ring raceways 5, 5 of the outer ring 2 and the inner ring raceways 8, 8 of the hub 3, a plurality of rolling elements 4 is arranged in each of the raceways, whereby the hub 3 is rotatably supported on the radially inner side of the outer ring 2.

The hub 3 includes a hub body 9, an inner ring 10 and a nut 11, while the inner ring raceways 8, 8 are formed on an intermediate portion of the hub body 9 and on an outer peripheral surface of the inner ring 10. The inner ring 10 is fitted onto a small diameter step portion 12 formed on a portion the hub body 9 near an axially inner end, and is fixed to the hub body 9 by the nut 11. Here, there is also widely known a structure in which the inner ring 10 is fixed to the hub body 9 using a riveting portion formed in the inner end portion of the hub body 9.

A bearing ring with an outward flange, which is a kind of an outwardly flanged metal member such as the outer ring 2 and hub body 9, can be manufactured by executing plastic working on metal material such as carbon steel. This plastic working method is conventionally widely known, for example, in Patent Documents 1 and 2.

FIG. 22 shows how to manufacture the hub body 9 by plastic working (warm or hot forging). Firstly, a long stock produced by rolling or the like is cut into a given length, thereby obtaining a cylindrical blank 13 shown in FIG. 22(A). Next, according to upsetting in which the blank 13 is compressed in the axial direction, there is provided a first intermediate work 14 of a beer barrel shape shown in FIG. 22(B). Next, according to a rough forming process in which, while the axially half portion of the first intermediate work 14 (in FIG. 22, the lower half portion of the blank 14; that is, the axially inner half portion of the hub body 9 after completed) is pushed into a mold (a die) having a given inner peripheral surface shape, the outside diameter of the axially half portion of the blank 14 is reduced, there is provided a second intermediate work 15 shown in FIG. 22(C). Next, according to a finish forming process in which, in a state where the second intermediate work 15 is set within a mold (a die) having a given inner peripheral surface shape, a punch is pressed against the axially other end face of the second intermediate work 15 (in FIG. 22, the upper end face of the blank 15; that is, the axially outer end face of the hub body 9 after completed) to dent the axially other end face, and also metal material of the second intermediate work 15 is caused to flow outwardly in the radial direction, thereby providing a third intermediate work 16 shown in FIG. 22(D). Since a flash 17 is formed in the surface of the third intermediate work 16 against which the die is butted, the flash 17 is removed by trimming, thereby providing a fourth intermediate work 18 shown in FIG. 22(E). Machining and grinding are carried out on the fourth intermediate work 18, thereby producing the hub body 9.

As the support flange 7 of the thus produced hub body 9, conventionally, there is generally used a disk shaped support flange 7 shown in FIG. 23(A). In the case that a disk shaped support flange 7 is formed according to the finish forming process shown in FIGS. 22(C)→(D), the flash 17 is generated along the entire perimeter of the outer peripheral edge of the support flange 7. Since the width of the flash 17 is narrow and the amount of scrap to be removed in the above-mentioned trimming operation is small, worsening of the yield of the material is limited. Also, a so called flashless working operation, which can prevent a flash, which needs to be removed, from being formed, can be carried out relatively easily.

On the other hand, in recent years, in order that the running performance of a vehicle such as the running comfort and running stability of the vehicle can be enhanced due to the reduced load of a spring, and also in order to reduce the cost of the outwardly flanged metal member due to the reduced cost of the material thereof, as shown in FIG. 23(B), there is proposed a hub body 9a which includes a radial support flange 7a in the outer peripheral surface thereof.

When finish forming process as shown in FIGS. 22(C)→(D) is carried out in order to produce this hub body 9a including a support flange 7a in which a plurality of protrusions 19, 19 are arranged radially, a large flash 17, 17a is formed as shown in FIG. 22(D) and FIG. 24(A). That is, the flash 17, 17a is formed not only in the outer peripheral edge portions of the respective protrusions 19, 19 of the support flange 7a but also between the protrusions 19, 19 adjacent to each other in the circumferential direction. Such a large flash 17, 17a, after execution of the finish forming process, is removed by a trimming operation which is carried out in FIGS. 22(D)→(E) and FIGS. 24(A)→(B), and are then wasted as a scrap piece 20. Even when the scrap pieces 20 are collected together and are reused, the yield of the material is worsened to cause an increase in the cost of the hub body 9a. Therefore, it is not desirable that the amount of scrap pieces 20 increases.

Here, the problem described above is raised not only when producing the hub body 9a having the radial support flange 7a in the outer peripheral surface thereof but also in a case where an outer ring 2 including a non-circular outwardly flanged mounting portion 6 (shown in FIGS. 25(A) and (B)) in the outer peripheral surface thereof is formed by hot forging or by warm forging.

Patent Document 1: Japanese Patent Publication No. JP 2006-111070 A

Patent Document 2: Japanese Patent Publication No. JP 2005-83513 A

DISCLOSURE OF THE INVENTION

Problem that the Invention is to Solve

The present invention is made in view of the above, and it is an object thereof to provide a method of manufacturing an outwardly flanged metal member, by which a metal member having outward flange portions which extend radially outwardly from a plurality of positions along a circumferential direction on an outer peripheral surface can be formed without a flash, or with a reduced amount of a flash.

Means for Solving the Problem

The above object of the present invention is achieved by the following features.

(1) A method of manufacturing an outwardly flanged metal member having outward flange portions protruding radially outwardly from a plurality of positions along a circumferential direction on one side of an outer peripheral surface in an axial direction. The method includes providing a die and a punch, the die having a stationary die and a movable die to which an elastic force toward the stationary die is applied, at least one of the stationary die and the movable die forming flange molding cavities adapted to work the outward flange portions, the punch being movable through inside the movable die, and plastically working, while surrounding a periphery of a metal blank by the die and butting a distal face of the movable die and a distal face of the stationary die, an axial end face of the blank by pressing the axial end face with the punch under a warm or hot condition. The plastically working includes forming the outward flange portions by filling the flange molding cavities with a portion of the blank.

(2) The method of manufacturing the outwardly flanged metal member as set forth in (1), in which a magnitude of the elastic force that presses the movable die toward the stationary die is set such that the butting of the movable die against the stationary die is maintained even when the flange molding cavities are filled with the blank.

(3) The method of manufacturing the outwardly flanged metal member as set forth in (1), in which a magnitude of the elastic force that presses the movable die toward the stationary die is set such that, while the movable die is butted against the stationary die along with a downward movement of the punch, the movable die cannot be retrained from floating up from the stationary die when the flange molding cavities are filled with the blank, and in which, until the blank enters partway into the flange molding cavities, the movable die is butted against the stationary die by, in addition to the elastic force, a friction force acting on a contact portion between an outer peripheral surface of the blank and an inner peripheral surface of the movable die and, subsequently, in a course of filling the flange molding cavities with the blank, the butting of the movable die against the stationary die is maintained by, in addition to the elastic force and the friction force, an elastic force of an elastic member disposed around the punch.

(4) The method of manufacturing the outwardly flanged metal member as set forth in (3), in which the elastic member is a Belleville spring.

(5) The method of manufacturing the outwardly flanged metal member as set forth in (3) or (4), in which the movable die is disposed to surround the punch so as to be downwardly movable by its own weight, and the elastic force that presses the movable die toward the stationary die is omitted.

(6) The method of manufacturing the outwardly flanged metal member as set forth in any one of (1) to (5), in which the outwardly flanged metal member is a hub body of a wheel support rolling bearing unit having, on a portion of the outer peripheral surface shifted from the outward flange portions in the axial direction, an inner ring raceway and a small diameter step portion onto which a separate piece of inner ring is fitted, and in which the stationary die with a cavity adapted to form the inner ring raceway and the small diameter step portion is used.

(7) The method of manufacturing the outwardly flanged metal member as set forth in any one of (1) to (5), in which the outwardly flanged metal member is an outer ring of a wheel support rolling bearing unit having double rows of outer ring raceways on an inner peripheral surface, and the method includes plastically working the blank by pressing from both sides in the axial direction with a pair of punches to form axial end portions of the blank into a cylindrical portion having an inner peripheral surface shape that correspond to outer peripheral surface shapes of the pair of punches, and simultaneously to form the outward flange portions on the outer peripheral surface of the cylindrical portion.

(8) The method of manufacturing the outwardly flanged metal member as set forth in any one of (1) to (7), in which the blank having a volume that is larger than required to form the outward flange portions on the outer peripheral surface of the cylindrical portion is used, and in which, after forming the outward flange portions by filling the flange molding cavities existing in a region surrounded by the stationary die, the movable die and the punch with the portion of the blank, the blank is further pressed with the punch to float the movable die up from the stationary die by an amount corresponding to an excess volume of the blank and to form a flash on outer peripheral edges of the outward flange portions.

(9) The method of manufacturing the outwardly flanged metal member as set forth in (1), in which the movable die includes a groove portion formed at positions corresponding to distal end portions of the outward flange portions to allow the blank to escape, and in which the plastically working includes forming the outward flange portions by causing excess blanks of the outward flange portions to enter into the groove portion.

(10) The method of manufacturing the outwardly flanged metal member as set forth in (1), in which the providing includes further providing a finishing die having a fishing stationary die and a finishing movable die, the finishing movable die a having groove portion at positions corresponding to distal end portions of the outward flange portions to allow the blank to escape, at least one of the finishing stationary die and the finishing movable die forming other flange molding cavities adapted to finish form the outward flange portions, and the method includes finish forming the outward flange portions by pressing the blank formed with the outward flange portions using the finishing die to cause excess blanks of the outward flange portions to enter the groove portion.

(11) The method of manufacturing the outwardly flanged metal member as set forth in (9) or (10), in which the groove portion is formed in a circular shape.

(12) The method of manufacturing the outwardly flanged metal member as set forth in (1), in which the providing includes further providing a finishing die having a fishing stationary die and a finishing movable die, at least one of the finishing stationary die and the finishing movable die forming other flange molding cavities adapted to finish form the outward flange portions, and the method further includes finish forming the outward flange portions by pressing the blank formed with the outward flange portions using the finishing die to compress the outward flange portions in a thickness direction.

The warm working is a plastic working in which metal is worked in the temperature range of 600 to 900° C.; and the hot working is a plastic working in which metal is worked at a temperature higher than the above range. On the other hand, cold working such as disclosed in Patent Document 1 is a plastic working of metal at room temperature. According to the manufacturing method of the invention, since metal material such as carbon steel is warm worked or hot worked, when compared with the cold working, a complicated shape can be worked and also a load necessary for the working can be controlled down to a low level. That is, in the case of carbon steel, depending on the amount of carbon, generally, in the temperature area of 200 to 400° C. or higher, the ductility of carbon steel is enhanced, which can reduce a load necessary for the plastic working of carbon steel. According to the invention, since metal material is plastic deformed at a temperature (600° C. or higher) higher than the temperature where the ductility can be enhanced, as described above, a complicated shape can be worked with a low load.

Advantageous Effect of the Invention

In a method of manufacturing an outwardly flanged metal member according to the invention, a metal member with complicated outward flange portions can be worked with a low load. Also, when the a plurality of portions of the metal member in the circumferential direction thereof are respectively projected outwardly in the radial direction thereof to thereby form a plurality of outward flange portions each having a non-circular outer peripheral edge shape, the amount of generation of a flash can be reduced. That is, such a flash can be prevented from being generated between the outward flange portions, or, even when a flash is unavoidably generated due to the complicated shapes of the outward flange portions or the like, such the flash can be limited to be small (having a narrow width). Therefore, since the amount of the metal material to be removed by trimming or the like and to be wasted as scrap can be controlled down to a minimum, the manufacturing cost of the outwardly flanged metal member can be reduced.

BRIEF DESCRIPTION OF THE DRAWINGS

FIGS. 6A-6E are a graphical representation and a sectional view to explain forces respectively applied in the vertical direction to a movable die as the working progresses.

FIGS. 8A-8E a sectional view of the second intermediate work shown in FIG. 8, explaining a finish forming process for working the second intermediate work into a third intermediate work.

FIGS. 13A-13E a sectional view of a first intermediate work shown in FIG. 13, explaining a rough forming process for working the first intermediate work into a second intermediate work.

FIGS. 13A-13E a sectional view of the second intermediate work shown in FIG. 13, explaining a finish forming process for working the second intermediate work into a third intermediate work.

FIGS. 16A-16E a sectional view of a first intermediate work shown in FIG. 16, explaining a rough forming process for working the first intermediate work into a second intermediate work.

FIGS. 16A-16E is a sectional view of the second intermediate work shown in FIG. 16, explaining a finish forming process for working the second intermediate work into a third intermediate work.

FIGS. 22A-22E are sectional views to explain processes employed in a conventional method of manufacturing a hub body.

FIGS. 22A-23B are perspective views of two examples of a conventional hub body having support flanges on the outer peripheral surface thereof.

EXPLANATION OF REFERENCE SIGNS

1: Wheel Support Rolling Bearing Unit
2: Outer Ring (Outwardly Flanged Metal member)
3: Rub
4: Rolling Elements
5: Outer Ring Raceway
6: Mounting Portion (Outward Flange Portion)
7: Support Flange
7a: Support Flange (Outward Flange Portion)
8: Inner Ring Raceway
9: Hub Body
9a: Hub body (Outwardly Flanged Metal Member)
10: Inner Ring
11: Nut
12: Small Diameter Step Portion
13, 13a: Blank
14, 14a: First Intermediate Work
15: Second Intermediate Work
16: Third Intermediate Work
17, 17a: Flash
18: Fourth Intermediate Work
19: Protrusion
20: Scrap Piece
21: Stationary Die
22: Movable Die
23: Punch
24: Forming Hole
25, 25a, 25b: Forming Recessed Portion
26: Mounting Plate
27: Final Intermediate Work
28: Circular Recessed Portion
29: Circular Protrusion
30: Ring-Shaped Step Surface
31, 31a: Elastic Member
32, 32a: Flange Molding Cavity
32b: Other Flange Molding Cavity
33, 33a, 33b: Second Intermediate Work
34, 34a, 34b: Third Intermediate Work
35: Fourth Intermediate Work
36, 36a, 36b: Final Intermediate Work
37: Flash
38: First Circular Recessed Portion
39: Second Circular Recessed Portion
40, 40a: Partition Wall Portion
41: Pressing Punch
42: Counter Punch
43: Upper Die (Movable Die)
44: Lower die (Stationary Die)
45: Extrusion Punch
46: Lower Cavity
47: Clearance
48: Belleville Spring
51, 53: Groove Portion
52, 54: Excess Blank
61: Upper Die (Finishing Movable Die)
62: Lower Die (Finishing Stationary Die)
63: Extrusion Punch

BEST MODE FOR CARRYING OUT THE INVENTION

First Embodiment

Figure 23:
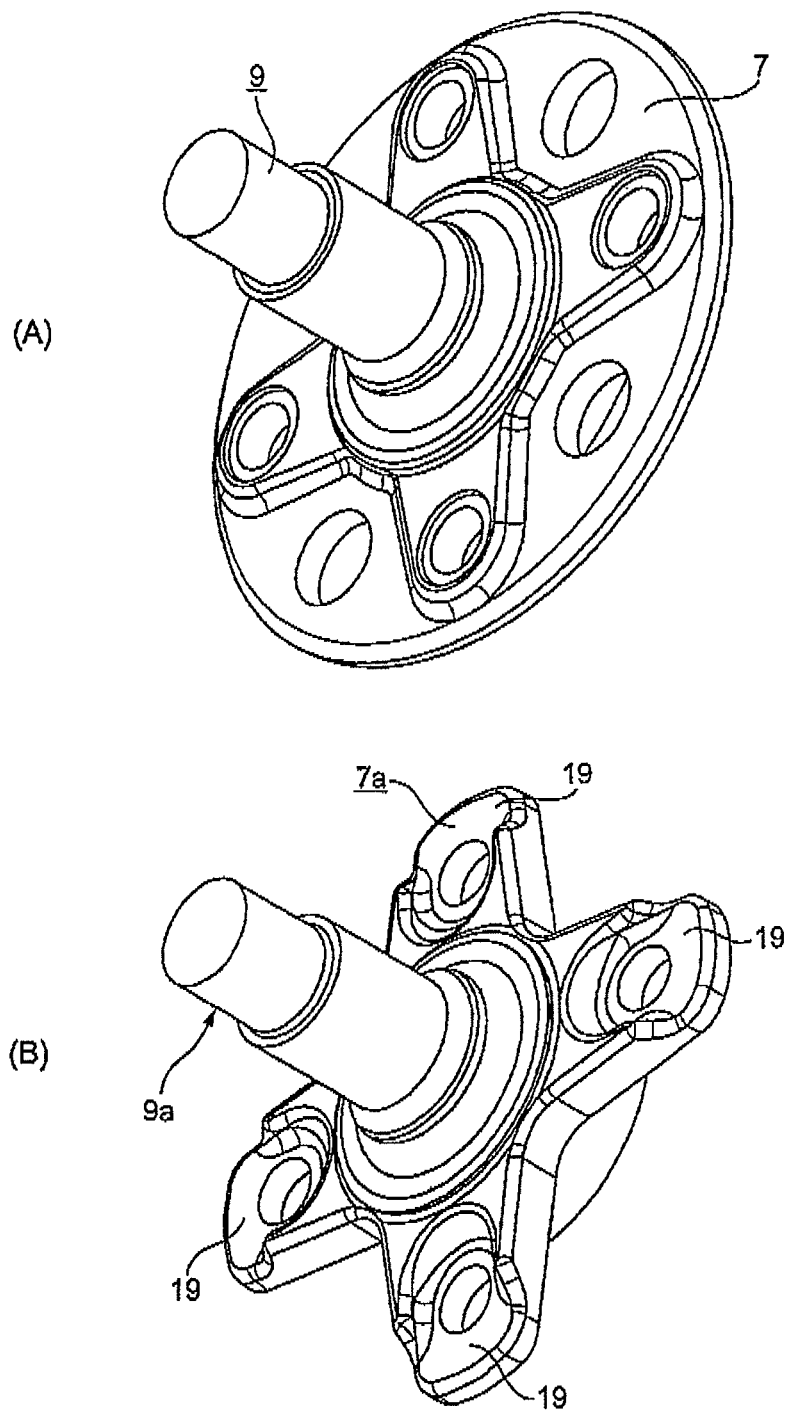

Firstly, description will be given below of a first embodiment of a method of manufacturing an outwardly flanged metal member according to the invention with reference to FIGS. 1 and 2. Here, in the present embodiment, as an example thereof, description will be given of a method of manufacturing such a hub body 9a as shown in FIG. 23 by hot forging.

Figure 1:
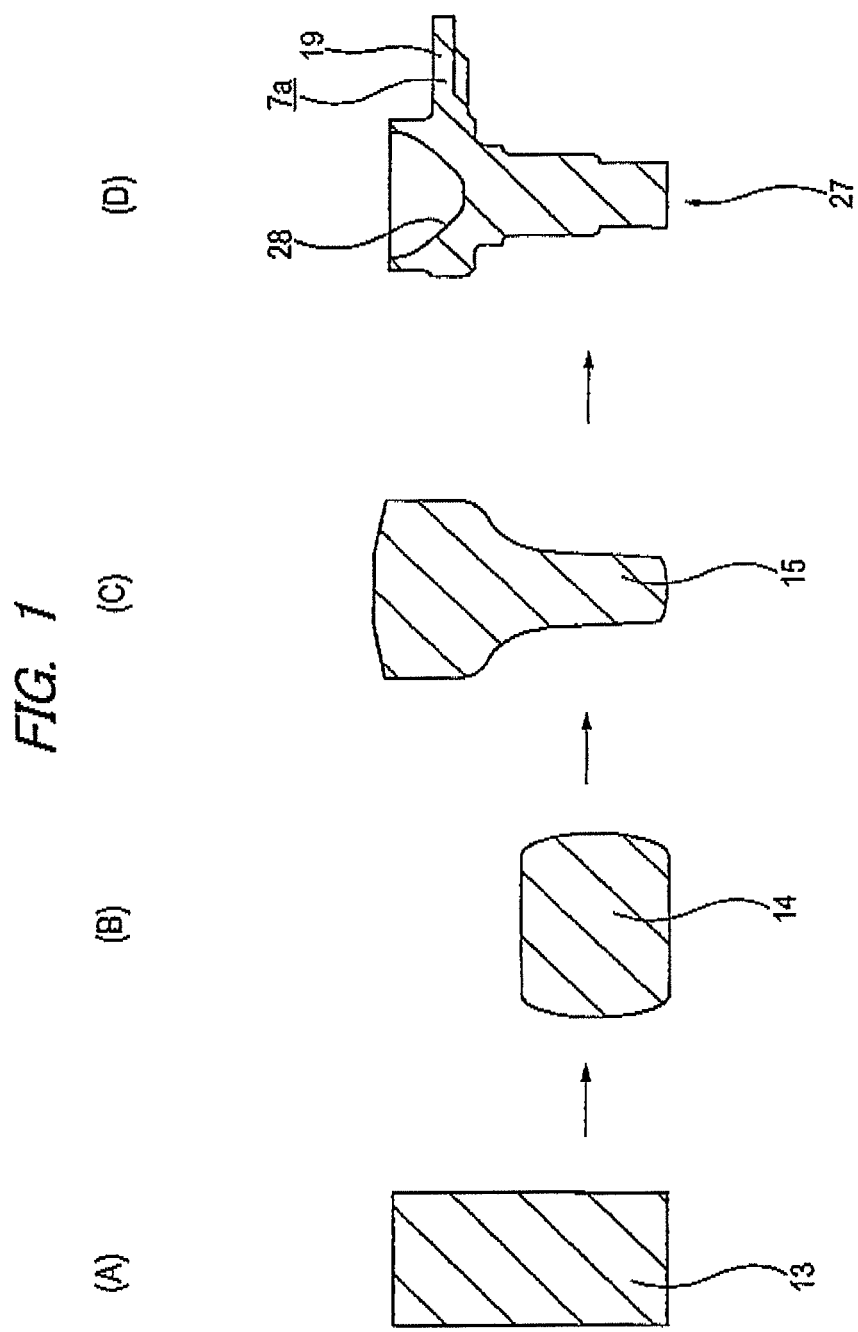
FIGS. 1A-1D are sectional views of a blank to a final intermediate work, explaining processes included in a method of manufacturing an outwardly flanged metal member according to a first embodiment of the invention.
Figure 2:
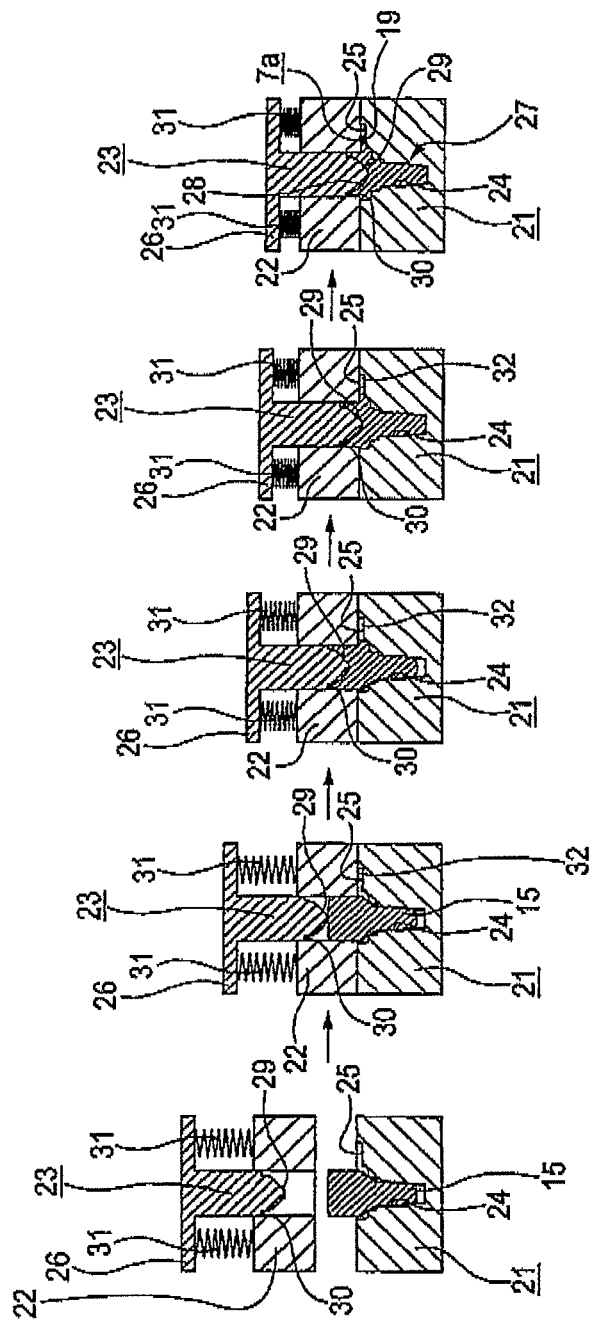
FIGS. 2A-2E are sectional views of the second intermediate work to the final intermediate work shown in FIGS. 1A-1D, explaining a finish forming process for working the second intermediate work into the final intermediate work.

According to the present embodiment, firstly, there is produced a cylindrical blank 13 shown in FIG. 1(A) which can be obtained by cutting a long stock into a given length. Here, to obtain such long stock, a metal material, which can be hardened after an iron-system alloy such as medium carbon steel is plastic worked, may be rolled and formed. Next, the blank 13 is compressed in the axial direction according to upsetting to thereby provide a first intermediate work 14 of a beer barrel shape shown in FIG. 1(B). Subsequently, the axially half portion (in FIG. 1, the lower half portion; and, the axially inner half portion of a hub body 9a after completed) of the first intermediate work 14 is pushed into a mold (a die) having a given inner peripheral surface shape to reduce the outside diameter of such axially half portion, thereby providing a second intermediate work 15 shown in FIG. 1(C). Here, according to the present embodiment, this second intermediate work 15 corresponds to a blank according to the invention. Processes respectively shown in FIGS. 1(A)→(C) are respectively similar to those of the conventional manufacturing method which was already described.

A manufacturing method according to the present embodiment is characterized by a finish forming process (shown in FIGS. 1(C)→(D)) which will be discussed below. According to this finish forming process, the second intermediate work 15 shown in FIG. 1(C), as shown in FIG. 2, is surrounded by a stationary die 21 and a movable die 22; and, in this state, the second intermediate work 15 is compressed in the axial direction using a punch 23 to thereby provide a final intermediate work 27 shown in FIG. 1(D).

In the central portion of the stationary die 21, there is formed a forming hole 24 having an inner peripheral surface shape corresponding to the axially inner half portion of a hub body 9a to be manufactured as a finished product. The inner peripheral surface of the forming hole 24 is formed to have such shape and size as allow the working of the axially inner half portion of the final intermediate work 27 which, since the axially inner half portion of the second intermediate work 15 is plastically worked (filling with the metal material of the second intermediate work 15), has an outer shape larger by an amount corresponding to a necessary cutting margin than the axially inner half portion of the hub body 9a after finished.

Figure 24:
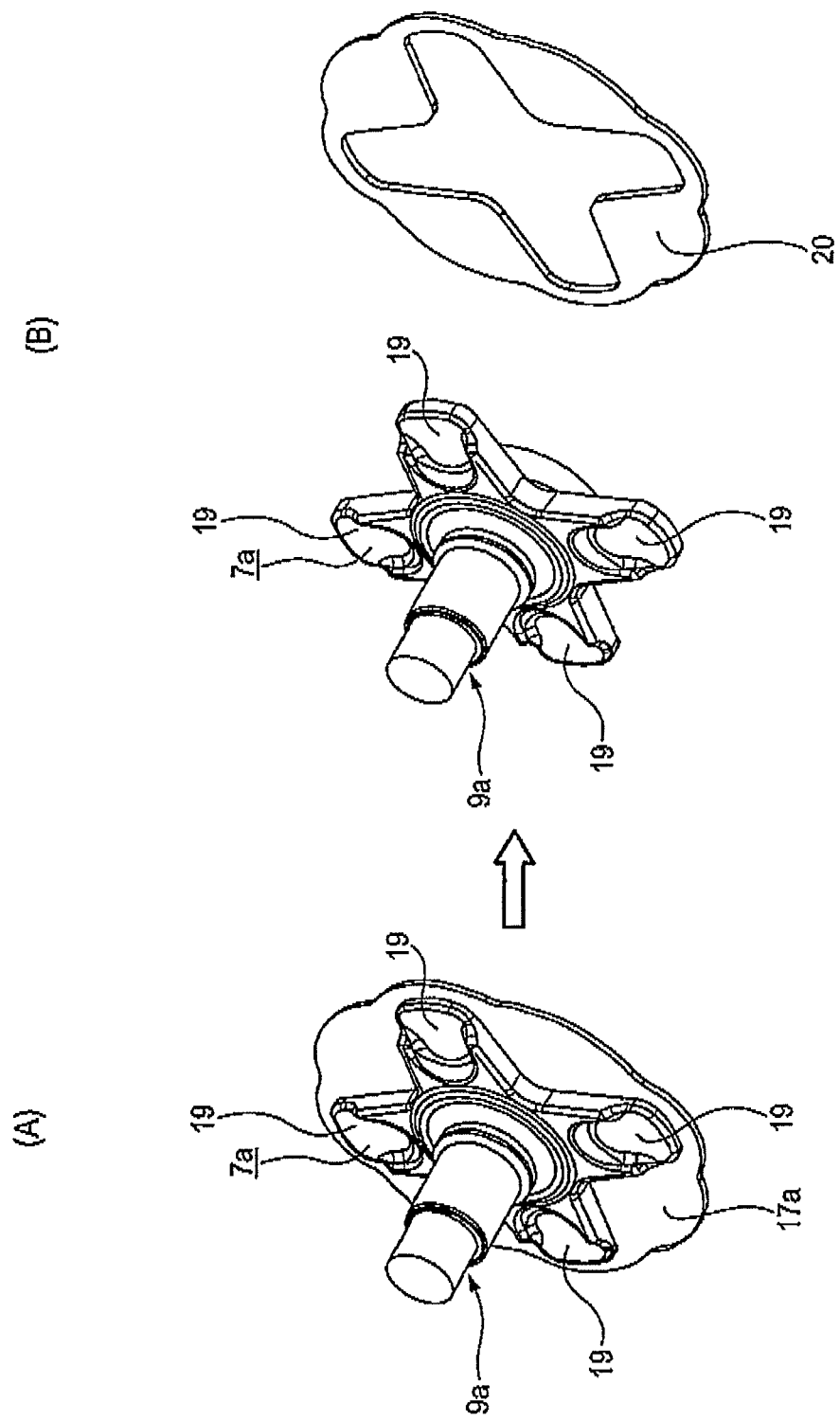
FIGS. 24A-24B are is perspective views of a blank to a fourth intermediate work in the conventional hub body, explaining how to remove a flash formed when forming radial is support flanges according to processes included in the conventional hub body manufacturing method.

Also, in the upper surface of the stationary die 21, there is formed a forming recessed portion 25 such that it continues outwardly in the radial direction at and from the upper end opening of the forming hole 24. The forming recessed portion 25 is used to form a support flange 7a, serving as an outward flange portion according to the invention, on a portion of the outer peripheral surface of the hub body 9a near an axially outer end. The forming recessed portion 25 has such shape and size as correspond (which are larger by an amount corresponding to a given cutting margin) to the support flange 7a shown in FIGS. 23 and 24. Also, the stationary die 21 is fixed to, for example, the base member of a press working machine for carrying out a hot forging operation.

On the other hand, the movable die 22 and punch 23 are respectively mounted on the lower surface of a mounting plate 26 which is to be supported on and fixed to the lower surface of a ram of a press working machine or the like. The movable die 22 is fitted on a periphery of the punch 23 such that it can be moved up and down. The punch 23 is connected and fixed to the central portion of the lower surface of the mounting plate 26 in a state where it is disposed in the vertical direction, and is mounted such that it can be moved in the vertical direction through the movable die 22. Also, the section of the punch 23 has a circular shape and the lower end portion of the punch 23 has a shape which corresponds to the shape of the axially outer end face of the final intermediate work 27. That is, in the lower end portion of the punch 23, there are formed a circular protrusion 29 used to form a circular recessed portion 28 in the central portion of the axially outer end face of the final intermediate work 27, and a ring-shaped step surface 30 which is formed in the periphery of the base end portion of the circular protrusion 29.

Also, between the movable die 22 and mounting plate 26, there are interposed elastic members 31, 31 such as a compression coil spring, whereby an elastic force going downwardly (going toward the stationary die 21) can be applied to the movable die 22. The elastic forces of the elastic members 31, 31 are considerably large and, specifically, these forces are smaller than the force of a ram to press the punch 23 downwardly but are larger than such force of the metal material, which is flowed into (filled) a forming recessed portion 25 (a flange molding cavity 32 which will be discussed later) due to the plastic deformation of the second intermediate work 15, as presses the movable die 22 upwardly. The amount of lowering of the movable die 22 with respect to a ram is restricted by a stopper mechanism which is interposed between the ram and movable die 22.

To form the second intermediate work 15 shown in FIG. 1(C) into the final intermediate work 27 shown in FIG. 1(D) using a forge working apparatus including the above-mentioned stationary die 21, movable die 22 and punch 23, firstly, as shown in FIG. 2(A), in a state where the movable die 22 and punch 23 are moved up, the axially inner half portion of the second intermediate work 15 may be set within the forming hole 24 of the stationary die 21. Next, when the movable die 22 and punch 23 are moved down using the ram of the press working machine, as shown in FIG. 2(B), the lower surface of the movable die 22 is butted against the upper surface of the stationary die 21. In this state, between the movable die 22 and forming recessed portion 25, there is formed a flange molding cavity 32 which is used to form a support flange 7a.

And, in and from this state, when the ram is moved down further, while the movable die 22 remains stopped at the then position, the punch 23 moves down while elastically deforming (compressing) the respective elastic members 31, 31. Due to the lower end face of the punch 23, the second intermediate work 15 is pressed strongly in the axial direction. In the initial to intermediate stages of this pressure, as shown in FIGS. 2(B)→(C)→(D), while denting the central portion of the axially outer end face of the second intermediate work 15, the axially inner half portion of the second intermediate work 15 is pushed into the forming hole 24. Due to this, the outer surface shape of the axially inner half portion of the second intermediate work 15 is worked into the outer surface shape of the axially inner half portion of the final intermediate work 27.

Also, as shown in FIG. 2(B), when the punch 23 is moved down still further using the ram from the state where the flange molding cavity 32 is formed, the axially inner half portion of the second intermediate work 15 is compressed in the axial direction, with the result that the metal material of the second intermediate work 15, as shown in FIGS. 2(C)→(D)→(E), is fed into the flange molding cavity 32. As a result of this, there is produced the final intermediate work 27 having a radial support flange 7a. Then, the movable die 22 and punch 23 are respectively moved up using the ram and the final intermediate work 27 is taken out from the forming hole 24 of the stationary die 21 using a knockout pin (not shown) or the like. The final intermediate work 27 taken out from the stationary die 21 is fed to the next process, where given machining and grinding are carried out on the final intermediate work 27 to thereby produce the hub body 9a shown in FIGS. 23 and 24.

As described above, according to the present embodiment, since a flash is not formed in the support flange 7a provided on the final intermediate work 27 (flashless), the yield of the material can be enhanced, thereby being able to reduce the manufacturing cost of the outwardly flanged metal member. Also, since there are eliminated a process for removing a flash and a mold for carrying out such process, the manufacturing cost of the outwardly flanged metal member can be reduced. Further, since a pressing load in forging can be reduced by an amount corresponding to the non-formation of an unnecessary flash, it is possible to use a press working machine of a small size. This can reduce the consumption of energy and thus the running cost of the press working machine can be reduced, thereby being able to reduce the manufacturing cost of the outwardly flanged metal member.

Second Embodiment

Figure 3:
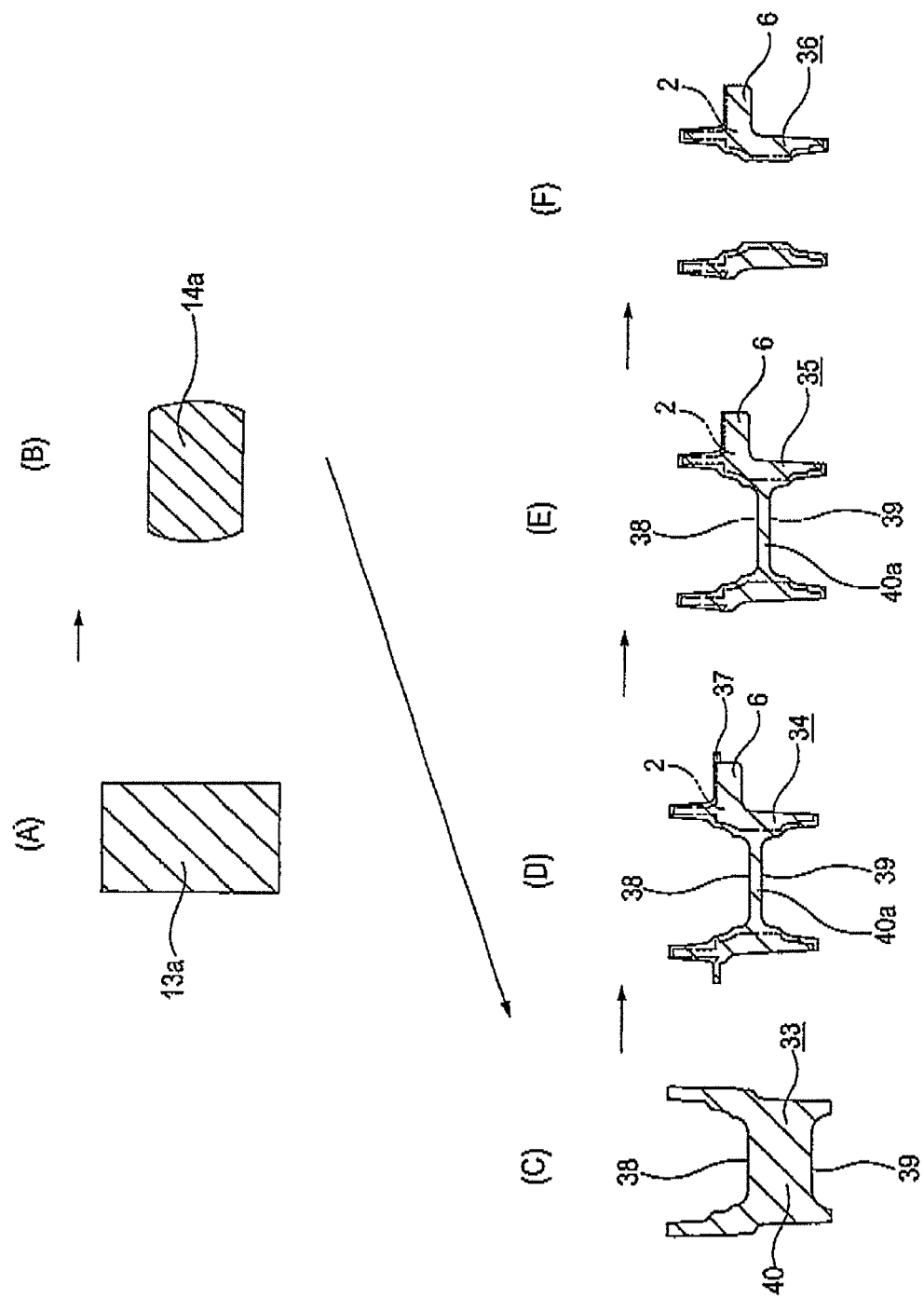
FIGS. 3A-3F are sectional views of a blank to a final intermediate work, explaining processes included in a method of manufacturing an outwardly flanged metal member according to a second embodiment of the invention.
Figure 25:
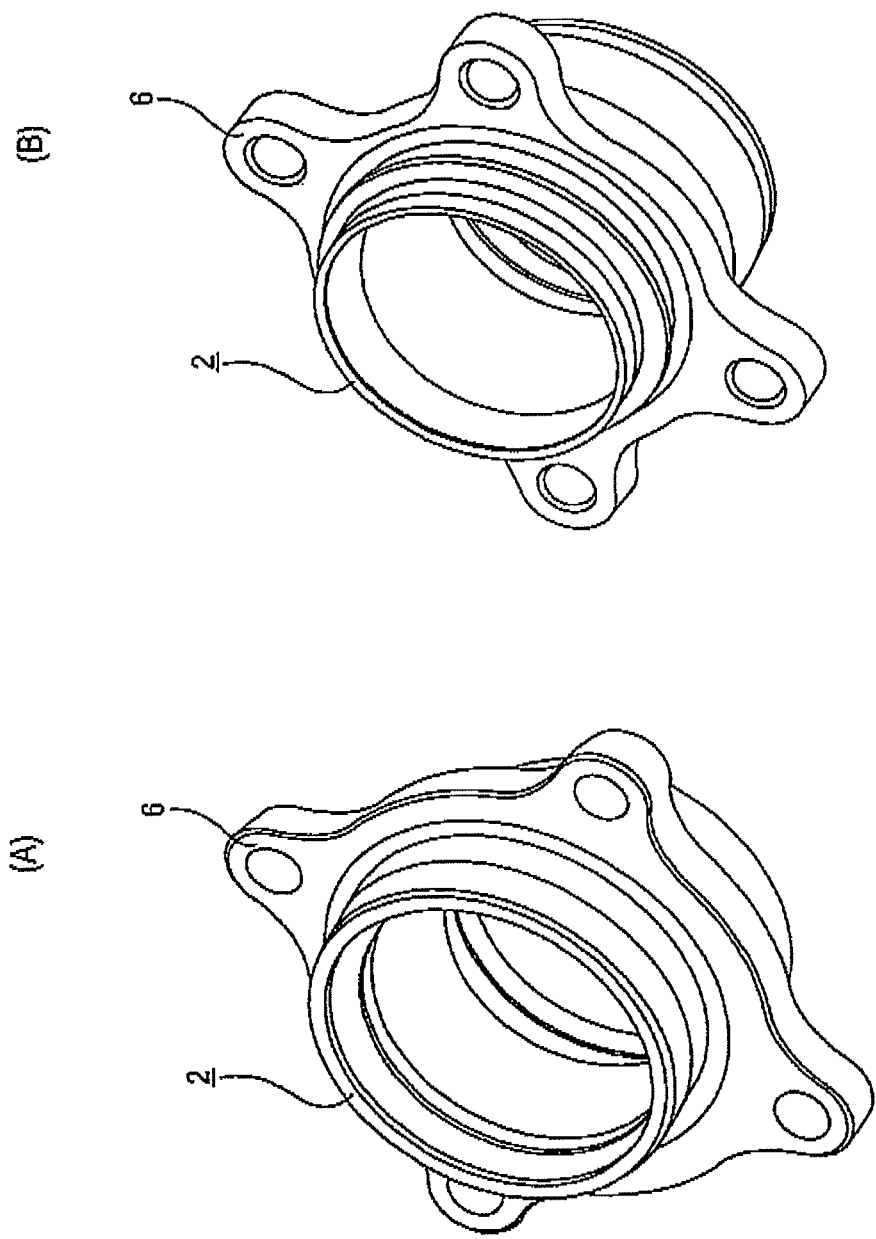
FIGS. 25A-25B are perspective views of two examples of a conventional outer ring having mounting portions in the outer peripheral surface thereof.

Next, description will be given below of a second embodiment of a method of manufacturing an outwardly flanged metal member with reference to FIGS. 3 and 4. Here, in the present embodiment, description will be given of an example in which such an outer ring 2 as shown in FIG. 25 is manufactured by hot forging.

In the present embodiment, there is used such a cylindrical metal blank 13a as shown in FIG. 3(A), which can be produced when an iron-system alloy such as medium carbon steel, bearing steel or cemented steel is plastically worked and, subsequently, is quenched or hardened. Specifically, on the blank 13a, there are carried out plastic working operations or blanking operations sequentially. Thus, through a first intermediate work 14a shown in FIG. 3(B), a second intermediate work 33 shown in FIG. 3(C), a third intermediate work 34 shown in FIG. 3(D) and a fourth intermediate work 35 shown in FIG. 3(E), there is produced a final intermediate work 36 shown in FIG. 3(F). Further, on the final intermediate work 36, there are executed necessary cutting operation and grinding operation, thereby producing the outer ring 2. The volume of the blank 13a is set slightly larger (when compared with the fourth intermediate work 35, by an amount corresponding to the volume of a flash 37 to be discussed later) than the original volume of the fourth intermediate work 35.

Now, description will be given below sequentially of processes for working the blank 13a to form the final intermediate work 36. Here, all of the following working operations are basically carried out under a hot or warm condition. However, if possible, for example, when forming a wheel support rolling bearing unit of a small size, such working operations may also be carried out under a cold condition.

Firstly, in upsetting, as shown in FIGS. 3(A)→(B), while compressing the blank 13a in the axial direction, the outside diameter thereof is spread, whereby the blank 13a is formed into the first intermediate work 14a of a beer barrel shape the radially middle portion of which is expanded.

Next, in a rough forming process, as shown in FIGS. 3(B)→(C), the first intermediate work 14a is plastically worked into the second intermediate work 33. In this rough forming process, using a method which is widely known in the forging field, a portion of the first intermediate work 14a near a radial center is compressed in the axial direction and, while moving the metal material of this portion near the radial center outwardly in the radial direction, the metal material is moved toward both sides in the axial direction (in the two forward and rearward directions). Here, in the present embodiment, the second intermediate work 33 corresponds to a blank according to the invention.

The second intermediate work 33 includes a first circular recessed portion 38 opened on the side of the axially one end face (in FIG. 3, the upper end face), a second circular recessed portion 39 opened on the side of the axially other end face (in FIG. 3, the lower end face), and a partition wall portion 40 which intervenes between the respective bottom surfaces of these circular recessed portions 38 and 39. According to the present embodiment, the first circular recessed portion 38 have a stepped shape in which its deep half portion having a small diameter and its open-side half portion having a large diameter are continuously connected to each other through a stepped portion. Therefore, as a pressing punch, there is used a pressing punch having a stepped shape in which the outside diameter of its front half portion is small and the outside diameter of its base half portion is large.

Next, in a finish forming process which is the characteristic of the present embodiment, the second intermediate work 33 is plastically worked into the third intermediate work 34. This finish forming process is carried out using a finish forming apparatus shown in FIG. 4.

This finish forming apparatus includes a pressing punch 41 and a counter punch 42 respectively corresponding to a pair of punches, an upper die 43 corresponding to a movable die, a lower die 44 corresponding to a stationary die, and a extrusion punch 45.

The upper die 43 is supported on the lower surface of a ram included in a press working machine such that it can be moved up and down with respect to the ram; and, to the upper die 43, there can be applied a downwardly going large elastic force by elastic members 31, 31 such as compression coil springs respectively having a large elastic force. Also, the amount of downward movement of the upper die 43 with respect to the ram is regulated by a stopper mechanism which is interposed between the ram and upper die 43. Also, the amount of upward movement of the upper die 43 is limited, for example, due to the butting of the lower surface of the ram and the upper surface of the upper die 43 against each other. Therefore, the upper die 43, in a normal state, moves up together with the ram. But, when there is applied an upwardly going large force thereto, the upper die 43 moves up with respect to the ram against the elastic forces of the respective elastic members 31, 31.

Also, the pressing punch 41 is fixed to the ram in a state where it penetrates through the upper die 43 in the vertical direction. Therefore, the upper die 43 is supported on the periphery of the pressing punch 41 such that it can be moved in the vertical direction. In the downward movement of the ram, the lower end face of the upper die 43 is butted against the upper end face of the lower the 44 before the partition wall portion 40 of the second intermediate work 33 is strongly held between the lower end face of the pressing punch 41 and the upper end face of the counter punch 42. When the ram is moved down further from this state, while the upper die 43 remains at the then position, only the pressing punch 41 is moved down together with the ram, whereby the elastic members 31, 31 are elastically deformed respectively.

On the other hand, the counter punch 42 and lower die 44 are concentrically fixed to the upper surface of the support base of the press working machine and, between them, there is formed a lower cavity 46 having an inner surface shape which corresponds to the outer surface shape of the axially outer half portion of the third intermediate work 34 (specifically, their concave and convex shapes are reverse to each other). The counter punch 42 and lower die 44 do not shift in position with the progress of the finish forming process.

Further, the extrusion punch 45 is cylindrical in shape, while the lower end portion of the lower cavity 46 is partitioned by the upper end face of the cylindrical extrusion punch 45. The extrusion punch 45 is supported such that it can be moved up and down with respect to the support base of the press working machine. And, in a state where the extrusion punch 45 is moved down to the lowest position, the inner surface shape of the lower cavity 46 provides a shape which corresponds to the outer surface shape of the axially outer half portion of the third intermediate work 34 (the fourth intermediate work 35).

According to the present embodiment, the leading end portion of the pressing punch 41 and the leading end portion of the counter punch 42 are both formed to have a stepped shape in which the small diameter portion thereof near to the leading end face and the large diameter portion thereof near to the base end are continuously connected to each other through a step portion. In a plurality of position along a circumferential direction of the upper end portion of the lower cavity 46 (for example, four positions), there is formed a forming recessed portion 25a which projects outwardly in the radial direction such that it is dented from the upper surface of the lower die 44.

Figure 4:
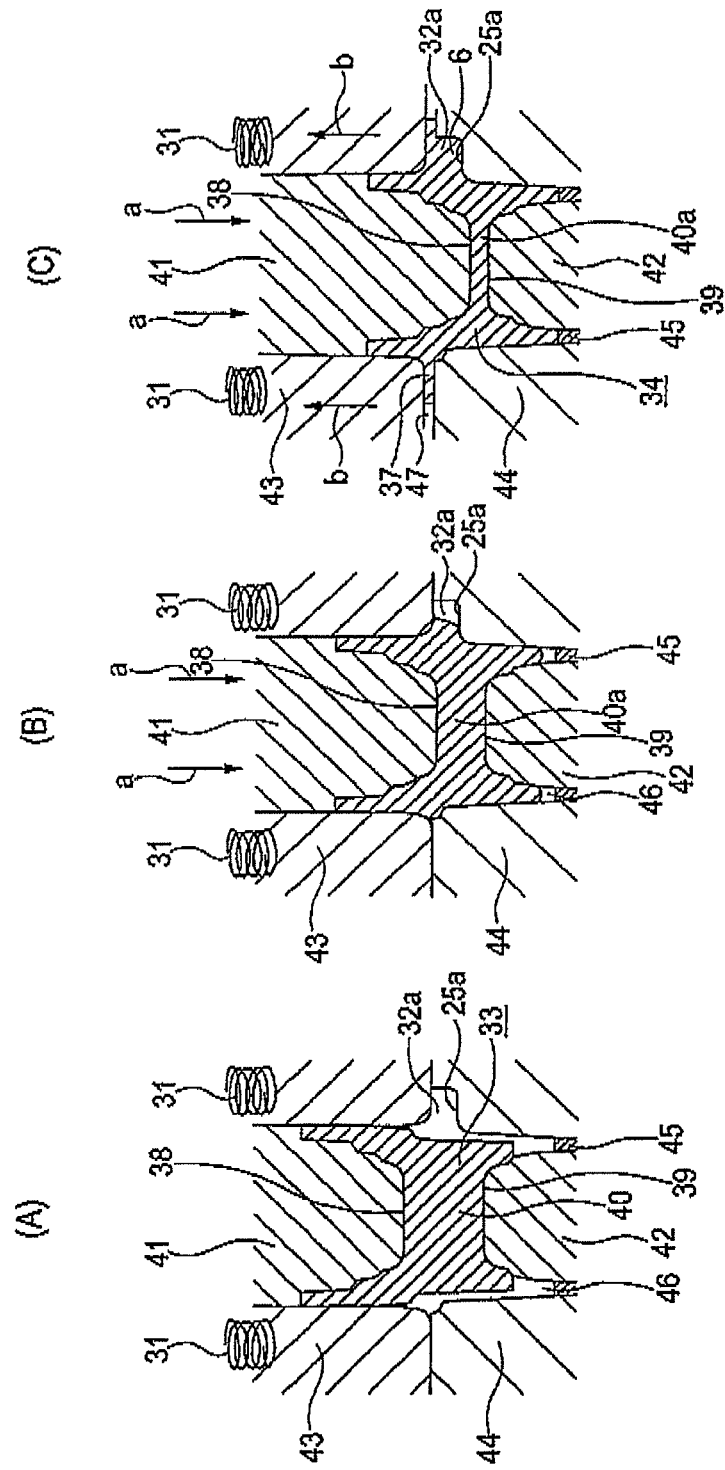
FIGS. 4A-4C are sectional views of the second and third intermediate works respectively shown in FIGS. 3A-3F, explaining upsetting for working the second intermediate work into the third intermediate work.

To form the second intermediate work 33 into the third intermediate work 34 by carrying out the finish forming process using the finish forming apparatus shown in FIG. 4, firstly, a portion of the second intermediate work 33 near an axially outer end may be inserted into the lower die 44 and the upper end portion of the counter punch 42 may be fitted into a second circular recessed portion 39 formed in the axially outer end face of the second intermediate work 33. Subsequently, the ram may be moved down, whereby, as shown in FIG. 4(A), the pressing punch 41 may be fitted into a first circular recessed portion 38 formed in the axially inner end face of the second intermediate work 33, and also the upper end face of the lower die 44 and the lower end face of the upper die 43 may be butted against each other. In this state, correspondingly to the forming recessed portion 25a, between the butted surfaces of the two dies 44, 43, there is formed a flange molding cavity 32a.

When the ram, as shown by arrows a, a in FIGS. 4(B) and (C), is moved down further from this state, as shown in FIGS. 4(A)→(B), the upper die 43 remains at the then position and only the pressing punch 41 is moved down. With the downward movement of the pressing punch 41, the pressing punch 41 presses the radially central portion of the second intermediate work 33 in the axial direction to compress such portion, thereby forming the partition wall portion 40 into a partition wall portion 40a having a small thickness dimension.

The metal material, which has been pushed out by compressing the radially central portion of the second intermediate work 33 in this manner, advances into the lower cavity 46 to thereby form such portion into a cylindrical shape. At the same time, part of the metal material is sent outwardly in the radial direction toward the flange molding cavity 32a to thereby form, within the flange molding cavity 32a, a mounting portion 6 which serves as an outward flange portion.

Also, according to the present embodiment, since the volume of the blank 13a used to provide the second intermediate work 33 is slightly larger than the original volume of the fourth intermediate work 35, the metal material goes fully into the corner portions of the flange molding cavity 32a. Therefore, even in the case that the mounting portion 6 to be worked has a complicated shape, the working of the mounting portion 6 can be carried out positively (such that the shape precision and dimension precision are secured sufficiently).

After the flange molding cavity 32a is filled with the metal material, further, when the pressing punch 41, as shown in FIG. 4(C), is sufficiently moved down, and a sufficient amount of metal material is pushed into the flange molding cavity 32a, the pressure within the flange molding cavity 32a increases by an amount corresponding to the excess amount of the metal material of the second intermediate work 33 as described above, thereby increasing a force which pushes the upper die 43 upwardly. And, when this force exceeds the elastic forces of the respective elastic members 31, 31, the upper die 43 moves upward as shown by arrows b, b in FIG. 4(C) against the elastic forces of the elastic members 31, 31, whereby the lower end face of the upper die 43 is separated from the upper end face of the lower die 44 and, between these two end faces, as shown exaggeratingly in FIG. 4(C), there is formed a clearance 47. Owing to this, part of the metal material inside the flange molding cavity 32a enters the clearance 47 to thereby form a flash 37 on the outer peripheral edge of the mounting portion 6. As a result of this, there is obtained the third intermediate work 34 shown in FIG. 3(D). The inner peripheral surfaces of the first and second circular recessed portions 38 and 39 formed in this third intermediate work 34 respectively have a stepped cylindrical surface shape in which its deep-side half portion having a small inside diameter and its open-side half portion having a large inside diameter are continuously connected to each other through a step portion.

According to the present embodiment, in a state where the working of the third intermediate work 34 is completed, the distal faces of the two dies 43, 44 are not contacted with each other but the clearance 47 intervenes between these two distal faces. Into this clearance 47, there goes the excess of the metal material to thereby form the flash 37. When, after the pressing punch 41 and upper die 43 are moved up, the extrusion punch 45 is moved up, the third intermediate work 34 can be taken out from the finish forming apparatus. As shown in FIGS. 3(D)→(E), the flash 37 is blanked and removed to thereby form the fourth intermediate work 35.

Finally, as shown in FIGS. 3(E)→(F), the partition wall portion 40a intervening between the two circular recessed portions 38, 39 is blanked and removed by press working or the like, thereby obtaining the final intermediate work 36. The final intermediate work 36 is larger in thickness than the outer ring 2 after completed (see two-dot chained lines shown in FIG. 3(D) to (F)). Therefore, given cutting (turning) working operation and grinding working operation are executed on the final intermediate work 36, thereby producing the outer ring 2 as a completed final product.

As described above, according to the present embodiment, although the flash 37 is generated following the working of the mounting portion 6 serving as an outward flange portion, the flash 37 is small in size and are necessary to enhance the shape precision of the mounting portion 6. Therefore, the flash 37 does not worsen the yield of the material so much but can be removed easily, thereby being able to reduce the manufacturing cost of the outer ring 2 having the mounting portion 6.

Third Embodiment

Figure 5:
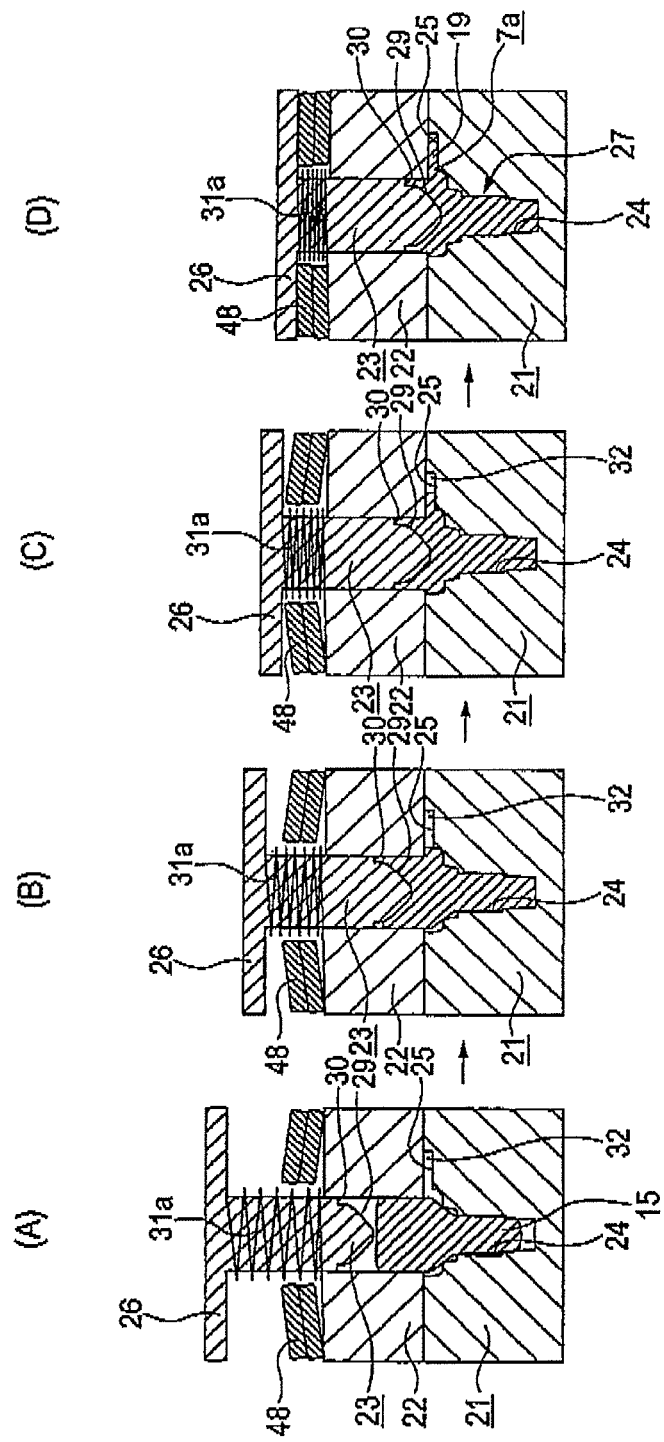
FIGS. 5A-5D are sectional views of a second intermediate work to a final intermediate work used in a method of manufacturing an outwardly flanged metal member according to a third embodiment of the invention, explaining a finish forming process for working the second intermediate work into the final intermediate work.
Figure 7:
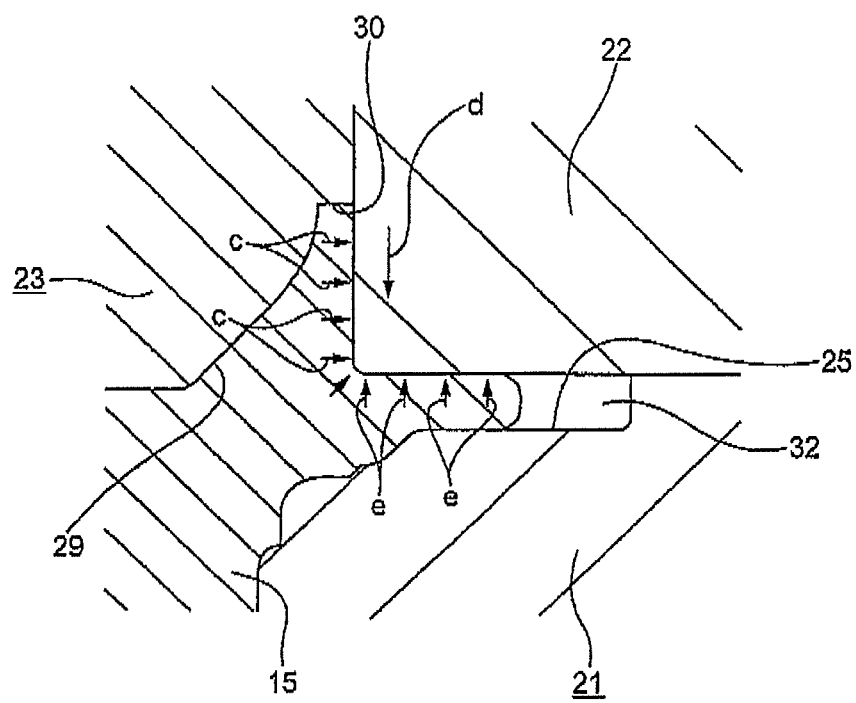
FIG. 7 is an enlarged view of the X portion shown in FIG. 6(C), explaining forces applied from a metal material to the movable die.
Figure 8:
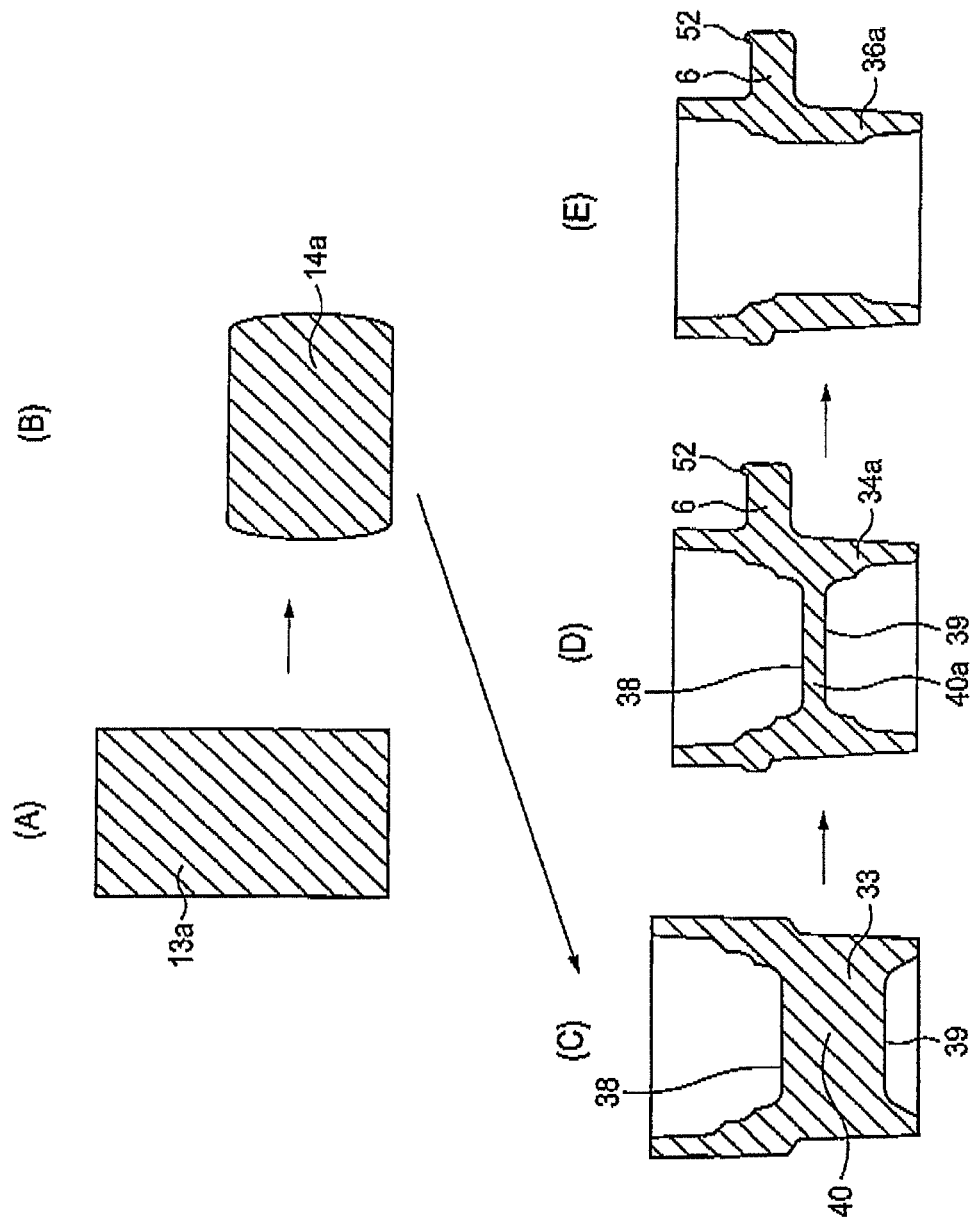
FIGS. 8A-8E are sectional views of a blank to a final intermediate work, explaining processes included in a method of manufacturing an outwardly flanged metal member according to a fourth embodiment of the invention.

Next, description will be given below of a method of manufacturing an outwardly flanged metal member according to the invention with reference to FIGS. 5 to 7. Here, according to the present embodiment, similarly to the previously described first embodiment, description will be given of an example in which the hub body 9a shown in the previously described FIG. 23 is manufactured by hot forging. However, in the first and second embodiments, the elastic members 31, 31 (see FIGS. 2 and 4) are respectively formed to have a large elastic force and thus only the elastic forces of the elastic members 31, 31 can prevent the movable die 22 (upper die 43) from floating up from the stationary die 21 (lower die 44) while the second intermediate work 15 (33) is plastically deformed into the final intermediate work 27 (third intermediate work 34) (even in a state where, in the final stage of the working process, the flange molding cavities 32, 32a are filled with the metal material).

According to the present embodiment, as an elastic member 31a which is used to press the movable die 22 downwardly toward the stationary die 21, there is used a compression coil spring which has a large expansion stroke but has a small elastic force. The elastic member 31a is fitted onto the base end portion (upper end portion) to the intermediate portion of the punch 23 penetrating through the inside of the movable die 22 in the vertical direction and presses the central portion of the upper surface of the movable die 22 downwardly.

The elastic force of the elastic member 31a is set equal to a force which, as the punch 23 is moved down, can butt the lower surface of the movable die 22 against the upper surface of the stationary die 21 positively. In other words, the elastic force of the elastic member 31a is set such that, in a state where the flange molding cavity 32 is filled with the metal material, cannot prevent the movable die 22 from floating up from the stationary die 21. Here, the elastic member 31a, as described above, can also be omitted depending on the installation situation of the movable die 22.

While using an elastic member having a small elastic force as the elastic member 31a, or instead of omitting the elastic member 31a, according to the present embodiment, the lower surface of the movable die 22 is butted against the upper surface of the stationary die 21 by a friction force which acts on the contact portion between the outer peripheral surface of the metal material, that is, the partial outer peripheral surfaces of the second intermediate work 15 to final intermediate work 27 and the inner peripheral surface of the movable die 22 in the state until the metal material enters partway into the flange molding cavity 32, that is, in the state shown in FIGS. 5(A)→(B)→(C) (when the elastic member 31a is used, the own weight of the movable die 22, the elastic force and friction force of the elastic member 31a; and, when omitted, only the own weight and friction force of the movable die 22).

Further, from now on, that is, as shown in FIGS. 5(C)→(D), in a process where the flange molding cavity 32 is filled with the metal material, the lower surface of the movable die 22 is kept butted against the upper surface of the stationary die 21 due to the own weight and friction force of the movable die 22 (when the elastic member 31a is used, the elastic force of the elastic member 31a and the own weight and friction force of the movable die 22) and, in addition to this, due to the elastic force of a Belleville spring 48. The Belleville spring 48 is disposed on the upper surface of the movable die 22 and in the periphery of the punch 23, while this spring 48 has a short expansion stroke but has a large elastic force.

The reason why the present embodiment employs the above structure is to control the possibility of occurrence of a fire due to heat in warm or hot forging operations and also to be able to reduce the size of the manufacturing apparatus, thereby reducing the manufacturing cost of the outwardly flanged metal member. Next, description will be given below specifically of this reason.

In a forging operation using a mold having a so called floating die structure in which the movable die 22 is disposed in the periphery of the punch 23, in order to press the movable die 22 against the stationary die 21 and also to maintain the mold in a closed state, generally, it is expected to use the pressing force (elastic force) of an oil pressure cylinder or a compression coil spring. However, since the method of manufacturing an outwardly flanged metal member according to the invention intends to carry out a warm or hot forging operation, the temperature of a member to be worked, as described above, reaches the temperature range of 600 to 900° C. in a warm forging operation and a higher temperature than this temperature range in a hot forging operation. The surface of the mold provides a considerably high temperature although it is not as high as the temperature of the member to be worked. Therefore, operating oil can leak from an oil pressure cylinder and, when the operating oil happens to touch the high temperature portion of the material, there is a possibility that a fire can break out. For this reason, it is not desirable to use an oil pressure cylinder in order to close the mold.

On the other hand, in the case of a compression coil spring, it is difficult to ensure an expansion stroke and ensure an elastic force at the same time. For example, when working a hub body of a wheel support rolling bearing unit for a car according to the manufacturing method of the invention, a necessary closing force (a force for pressing the movable die 22 against the stationary die 21) reaches about several 100 kN to 1000 kN (several 10 tf to 100 tf). Also, when this force is obtained using a compression coil spring, an expansion stroke necessary in the compression coil spring (an expansion stroke between a state shown in FIG. 2(B) and a state shown in FIG. 2(E)) is about several 10 mm. A compression coil spring, which has such elastic force as can obtain the above large force over the whole range of such large expansion stroke, requires a large size, or a considerable number of compression coil springs. This inevitably increases the size of a mold having a floating die structure incorporating therein such large compression spring or a considerable number of compression coil springs and further increases the size of a forging apparatus with such mold incorporated into a pressing machine. Undesirably, such increased size leads to an increase in the manufacturing cost of an outwardly flanged metal member which is manufactured using such forging apparatus.

In view of the above circumstance, according to the present embodiment, in the case that an effective stroke is short, the movable die 22 is elastically pressed against the stationary die 21 with a large force only in the final stage of the forging working using the Belleville spring 48 which is small in size and can provide a large elastic force. That is, during the time that ranges from the initial stage to intermediate stage of the forging operation shown in FIGS. 5(A)→(B)→(C), specifically, during the time before part of the metal material used to form the second intermediate work 15 into the final intermediate work 27 starts to go into the near-to-inside-diameter portion of the flange molding cavity 32, without using the elastic force of the Belleville spring 48, the lower surface of the movable die 22 is pressed against the upper surface of the stationary die 21. That is, during the time before the material starts to go into the cavity 32, except for the own weight of the movable die 22, using only the friction force applied between the outer peripheral surface of the metal material and the inner peripheral surface of the movable die 22 (in the case that the elastic member 31a is used, the elastic force and friction force of the elastic member 31a), the lowering force transmitted from the ram of the press working apparatus to the punch 23 is transmitted the movable die 22 to thereby press the lower surface of the movable die 22 against the upper surface of the stationary die 21.

In the final stage of the forging operation shown in FIGS. 5(C)→(D), the lower surface of the mounting plate 26 provided on the base end portion (upper end portion) of the punch 23 starts to compress the Belleville spring 48 between itself and the upper surface of the movable die 22. In this state, to the movable die 22, there is applied, in addition to the lowering force transmitted from the punch 23 to the movable die 22 according to the friction force (in the case that the elastic member 31a is used, the elastic force and friction force of the elastic member 31a), the elastic force of the Belleville spring 48 as a force which goes toward the stationary die 21. As a result of this, although the push-up force applied to the movable die 22 in this stage is larger than a push-up force which is applied to the movable die 22 in the process where the flange molding cavity 32 is filled with the metal material, that is, a push-up force applied in the intermediate stage shown in FIGS. 5(B)→(C), the lower surface of the movable die 22 can be kept butted against the upper surface of the stationary die 21.

As described above, according to the present embodiment, even without using an oil pressure cylinder or a large-size compression coil spring, a flash can be prevented from being formed in the outer peripheral edge of the support flange 7a of the final intermediate work 27, or even if a flash is formed, the flash is small in size (a so called flashless forging operation is possible). Also, the Belleville spring 48 is compressed only in the final stage of the forging operation but is not compressed in the initial stage to intermediate stage shown in FIG. 5(A)→(B)→(C). Therefore, in the process for lowering the ram, the stroke necessary to elastically compress the Belleville spring 48 can be shortened. This eliminates the need to consume extra energy in order to elastically compress the Belleville spring 48. That is, this energy conservation can reduce the running cost of the forging apparatus. Here, although the expansion stroke of the Belleville spring 48 is determined in the stage of design depending on the shape and size of a member to be worked, for example, when working a hub body of a wheel support rolling bearing unit for a car, as will be discussed later, about 5 mm is enough.

Next, description will be given below of the theoretical base of the manufacturing method according to the present embodiment. As shown in FIGS. 6(A)→(B)→(C)→(D), in the process for working the second intermediate work 15 into the final intermediate work 27, when the leading end portion of the punch 23 presses against the upper end face of the second intermediate work 15 and thus the second intermediate work 15 starts to deform plastically, the outer peripheral surface of the metal material of the second intermediate work 15, as shown by arrows c, c in FIG. 7, is pressed against the inner peripheral surface of the movable die 22. As a result of this, there is generated pressure (vertical drag) in the contact portion of these two peripheral surfaces. In other words, the outer peripheral surface of the metal material and the inner peripheral surface of the movable die 22 are frictionally engaged with each other. When the punch 23 lowers further from this state (the forming operation progresses further), the metal material moves downwardly toward the stationary die 21. Thus, according to the frictional engagement of the two peripheral surfaces, the movable die 22 is pressed downwardly toward the stationary die 21 as shown by an arrow d in FIG. 7.

As a result of this, the lower surface of the movable die 22 is strongly butted against the upper surface of the stationary die 21. That is, the friction force of the metal material itself generates a closing force which can keep the butted surfaces of the two dies 22, 21 closed. In the warm forging and hot forging operations (especially, the hot forging operation) intended by the present invention, when compared with a cold forming operation, the coefficient of friction of the contact portion between a member to be worked and a mold (movable die 22) is high. Therefore, only the friction force to be generated by the metal material itself can provide a closing force of about several hundreds of kN (several tens of tf). Accordingly, from the initial stage to intermediate stage of the forging operation, the butted surfaces of the two dies 22, 21 can be kept closed only by the above friction force. On the other hand, in the process where the flange molding cavity 32 is filled with the metal material, as shown by arrows e, e in FIG. 7, to the movable die 22, there is applied a force which goes in a push-up direction. In the final stage of the working operation, this push-up direction force becomes larger than the lowering direction force shown by the above-mentioned arrow d. Therefore, only the above-mentioned friction force is not able to keep the butted surfaces of the two dies 22, 21 closed.

FIG. 6(E) shows the results that are obtained when forces shown in FIGS. 6(A)→(B)→(C)→(D) and applied to the movable die 22 in the vertical direction with the progress of working on the second intermediate work 15 to final intermediate work 27 are analyzed according to a finite element analysis. In FIG. 6(E), the horizontal axis expresses the stroke of the punch 23 (as shown in FIG. 6(D), the amount of upward movement of the punch 23 from a state where it lowered down to a working end position), and the unit thereof is mm. Also, the vertical axis expresses the size of a rising direction force to be applied to the movable die 22 and the unit is tf (kN/9.8). This force is the sum of a minus (−) direction force for pressing the movable die 22 according to the above-mentioned friction force and a plus (+) direction force for pressing the movable die 22 upwardly by the metal material filled into the flange molding cavity 32. The fact that the size of the rising direction force, which is the sum of the two forces in such two directions, is minus (−) shows a state in which the closing force for closing the butted surfaces of the two dies 22, 21 according to the above friction force exceeds the force for pressing the movable die 22 upwardly due to the metal material filled into the flange molding cavity 32. In this state, even when a closing force using a spring or the like is not applied to the movable die 22, the butted surfaces will not be opened.

On the other hand, the fact that the size of the force in the rising direction is (+) shows a state in which the force for pressing the movable die 22 upwardly due to the metal material filled into the flange molding cavity 32 exceeds the closing force for closing the butted surfaces of the two dies 22, 21 according to the above friction force. In this state, unless a closing force due to a spring or the like is applied to the movable die 22, the butted surfaces are opened. However, in a diagram shown in FIG. 6(E), as can be seen clearly from the value of a curved line in the diagram where it passes through a horizontal line expressing the size of the force applied to the movable die 22 as 0 ft, the upward pressing range of the movable die 22 is limited to the range where the stroke of the punch 23 is the remaining 1.5 mm or so in the final stage of the working process.

For example, when processing a hub body for a vehicle wheel support rolling bearing unit, the entire stroke of the punch 23 reaches about 30 mm. However, the final 1.5 mm (1/20 of the whole stroke) is enough to press the Belleville spring 48. Even when some room is given, the final 3.0 mm (1/10 of the whole stroke) is enough. Also, as the elastic force of the Belleville spring 48, about 980 kN (100 tf) is enough even when some room is given. Here, when the Belleville spring 48 is compressed completely, the durability thereof is impaired. Therefore, preferably, some room may be given to the expansion stroke thereof when compared with the using range thereof. However, even in this case as well, about 5 mm is enough. As a Belleville spring having an elastic force of about 980 kN and an expansion stroke of about 5 mm, there can be easily prepared a Belleville spring which is not specially bulky but small in size (for example, a Belleville spring having a thickness of about 30 mm in the axial direction thereof). Therefore, according to the present embodiment, a mold having a floating die structure and thus a forging apparatus incorporating such mold therein can be reduced in size and weight. That is, the present embodiment has an advantage that the manufacturing cost of an outwardly flanged metal member, which is manufactured using such forging apparatus, can be reduced.

Here, according to the present embodiment, in the case that the elastic force of the Belleville spring 48 is set slightly smaller than the maximum value (70 tf) in the diagram of FIG. 6(E) (that is, the closing force thereof is weakened, that is, it is set in the range of about 30-50 tf), in the final stage of the forging operation, the lower surface of the movable die 22 can be slightly floated from the upper surface of the stationary die 21 and thus, instead of generating a slight flash in the outer peripheral edge of the support flange 7a, a support flange 7a having a complicated shape can be formed with high precision.

Fourth Embodiment

Next, description will be given below of a method of manufacturing an outwardly flanged metal member according to a fourth embodiment of the invention with reference to FIGS. 8 to 11. Here, in the present embodiment, description will be given of an example thereof in which such an outer ring 2 as shown in the previously described FIG. 25 is manufactured by hot forging. Also, the parts of the present embodiment similar to or equivalent to those of the first to third embodiments are given the same designations in the drawings and thus the description thereof will be omitted or simplified.

According to the present embodiment, plastic working operations or blanking operations are carried out sequentially on a cylindrical metal blank 13a shown in FIG. 8(A), whereby, through a first intermediate work 14a shown in FIG. 8(B), a second intermediate work 33 shown in FIG. 8(C) and a third intermediate work 34a shown in FIG. 8(D), there is obtained a final intermediate work 36a shown in FIG. 8(E). Then, given machining and grinding are executed on the final intermediate work 36a, thereby producing the outer ring 2. Here, in the present embodiment, the second intermediate work 33 corresponds to a blank according to the invention.

Next, description will be given below of processes for working the blank 13a into the final intermediate work 36a sequentially. Here, the following working operations, basically, are all carried out under a hot or warm condition. However, when forming a wheel support rolling bearing unit of a small size or the like, if possible, the working operations may also be carried out under a cold condition.

Firstly, in upsetting, as shown in FIGS. 8(A)→(B), the blank 13a is compressed in the axial direction to thereby spread the outside diameter thereof, whereby the blank 13a is worked into the first intermediate work 14a of a beer barrel shape the axially middle portion of which is expanded.

Next, in a rough forming process, as shown in FIGS. 8(B)→(C), the first intermediate work 14a is plastically worked into the second intermediate work 33. In this rough forming process, according to a method which is widely known in the forging field, a portion of the first intermediate work 14a near a radial, center is compressed in the axial direction; and thus, the metal material of the portion of the first intermediate work 14a near the radial center is moved outwardly in the radial direction and is also moved toward both sides in the axial direction (in the forward and backward directions). Here, according to the present embodiment, this rough forming process may also be omitted.

Next, in a finish forming process which is the characteristic of the present embodiment, as shown in FIGS. 8(B)→(C), the second intermediate work 33 is plastically worked into the third intermediate work 34a. This finish forming process is carried out using a finish forming apparatus shown in FIG. 9.

The finish forming apparatus includes: a pressing punch 41 and a counter punch 42 which respectively correspond to a pair of punches; an upper die 43 corresponding to a movable die; a lower die 44 corresponding to a stationary die; a extrusion punch 45; an elastic member 31a which is interposed between the lower surface of a mounting plate 26 of the pressing punch 41 and the upper surface of the upper die 43 and also fitted onto the base end portion and middle portion of the pressing punch 41; and a Belleville spring 48 disposed on the upper surface of the lower die 44 in the periphery of the pressing punch 41. In the upper end face of the lower die 44, there is formed a forming recessed portion 25a and, between the butted surfaces of the lower end face of the upper die 43 and the upper end face of the lower die 44, there is formed a flange molding cavity 32a.

Figure 9:
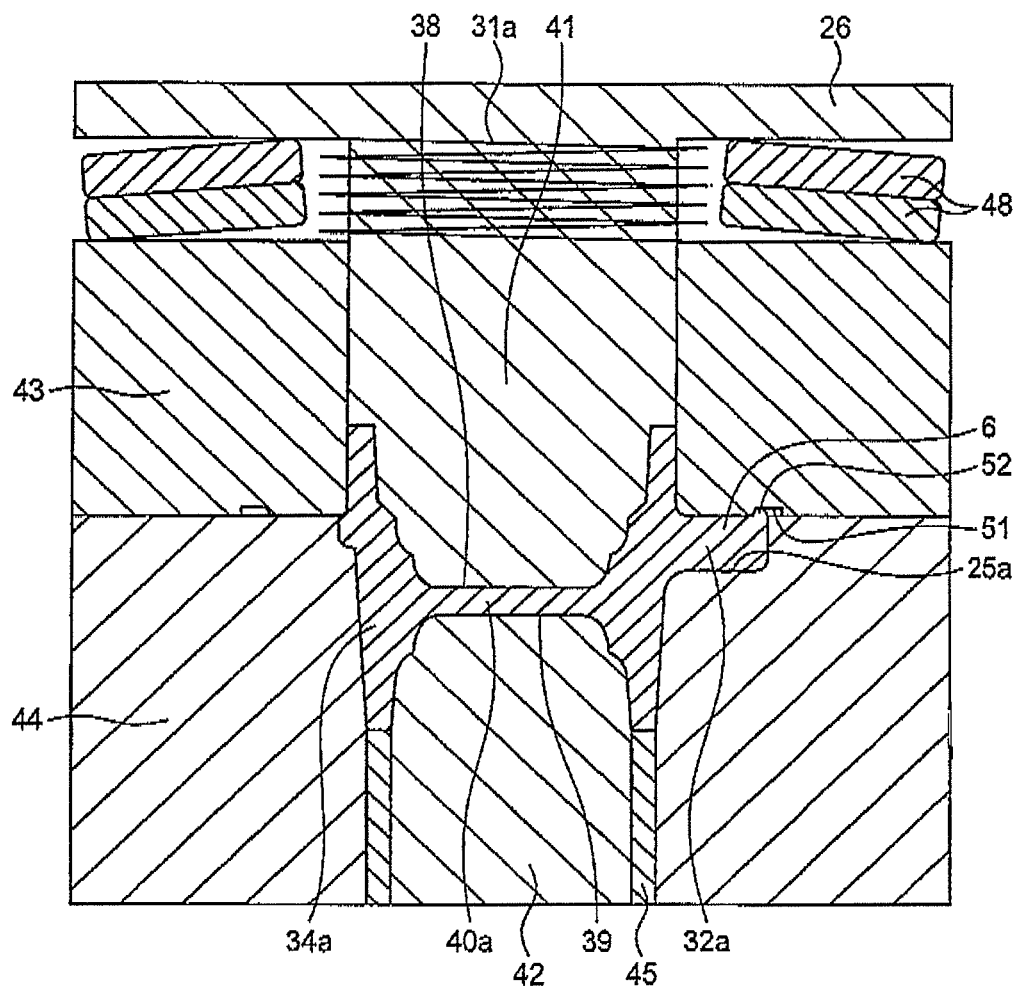
Figure 10:
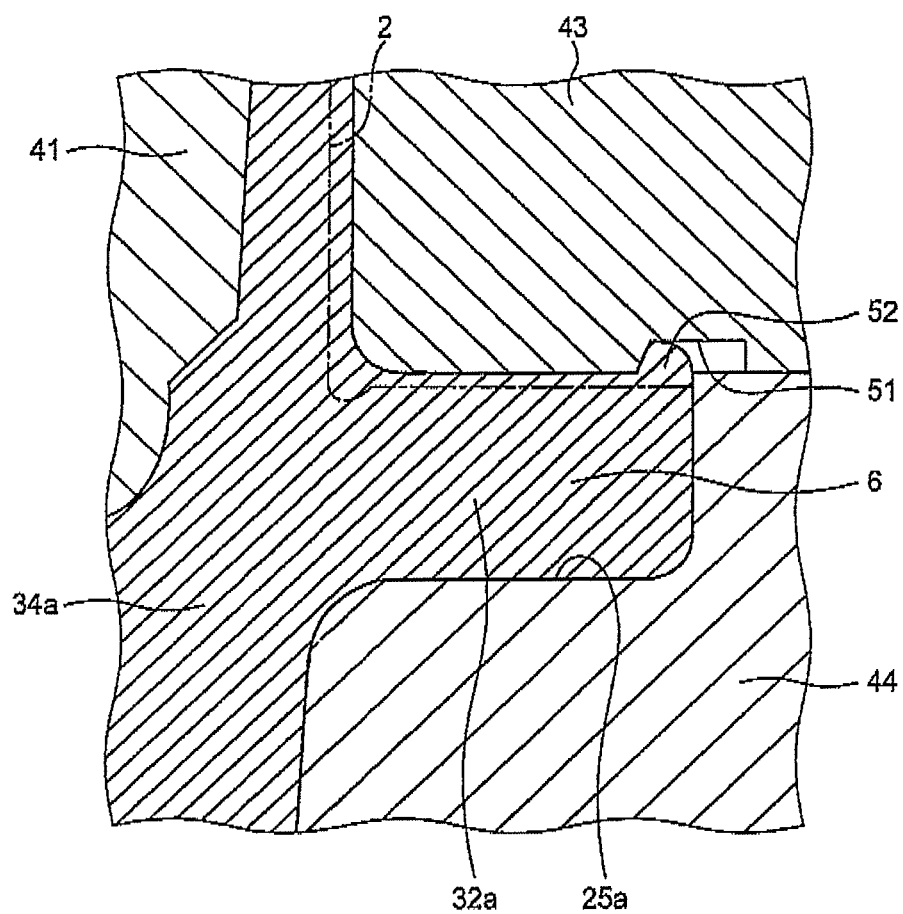
FIG. 10 is an enlarged sectional view of the vicinity of a mounting portion formed in the third intermediate work shown in FIG. 9.
Figure 11:
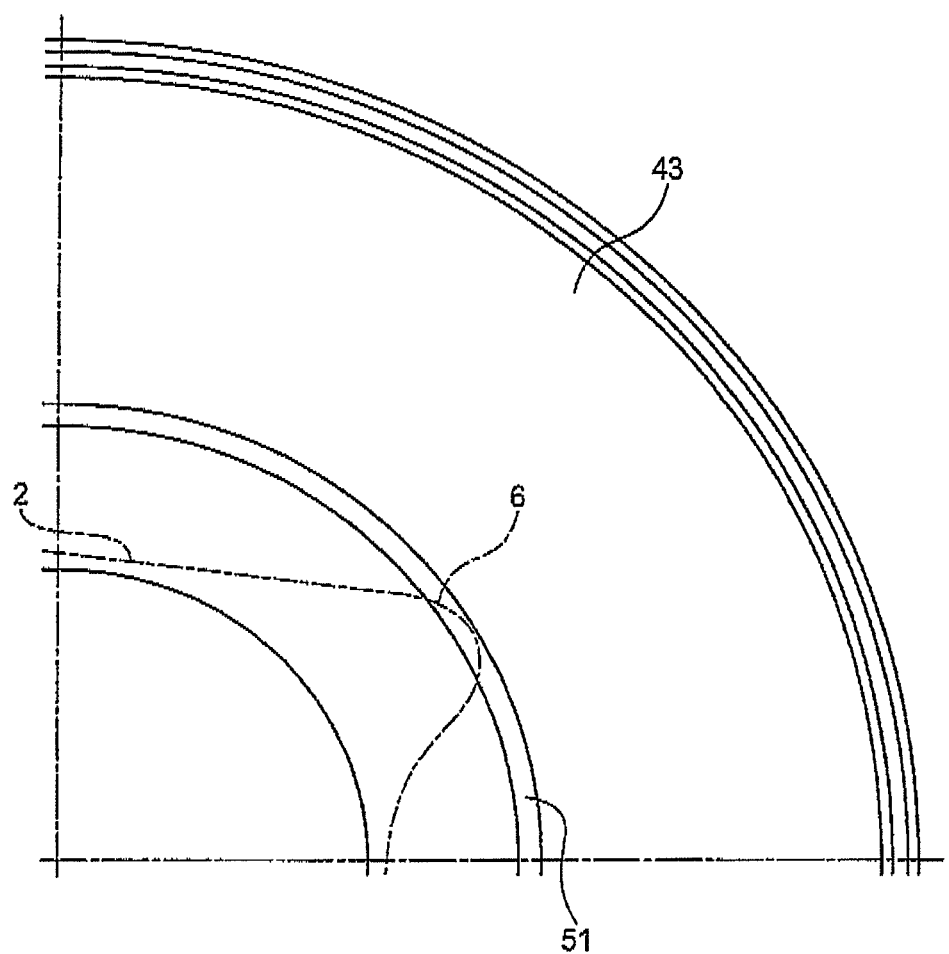
FIG. 11 is an enlarged lower view of an upper die shown in FIG. 9.

As shown in FIGS. 9 to 11, at such position of the lower surface of the upper die 43 according to the present embodiment as corresponds to the leading end portion of a mounting portion 6 serving as an outward flange portion, there is formed a groove portion 51 for escape of the metal material serving as a blank; and, the groove portion 51 is formed to have a circular shape when it is viewed from above. Here, in the case that the upper and lower dies 43, 44 are put in phase with each other, the groove portion 51 may not have the circular shape but it may also be formed only at the positions that correspond to the distal end portions of the mounting portions 6. Here, a one-dot chained line shown in FIG. 11 expresses the outside line of the outer ring 2.

Therefore, in the finish forming process according to the present embodiment, the second intermediate work 33 is plastically worked using the finish forming apparatus shown in FIG. 9, whereby the excess metal material 52 of the third intermediate work 34a is caused to go into the groove portion 51 of the upper die 43 to thereby form the mounting portion 6. Thus, since the metal material is allowed to go even into the corner portions of the flange molding cavity 32a fully, even when the mounting portion 6 to be worked has a complicated shape, the mounting portion 6 can be formed positively without generating a flash. Also, since the excess metal material 52 is removed by given machining and grinding working operations which will be discussed later, it is not necessary to separately prepare a process for removing the excess metal material 52.

Next, in the blanking process, as shown in FIGS. 8(D)→(E), a partition wall portion 40a intervening between the first and second circular recessed portions 38 and 39 of the third intermediate work 34a is blanked and removed by a press working operation or the like, whereby the third intermediate work 34a is worked into the final intermediate work 36a.

Since the final intermediate work 36a is larger in thickness than the outer ring 2 after completed (see a one-dot chained line shown in FIG. 10), given cutting (turning) operation and grinding operations are carried out on the final intermediate work 36a, thereby completing it as the outer ring 2.

As described above, according to the present embodiment, the groove portion 51 for escape of the blank (metal material) is formed at the position corresponding to the leading end portion of the mounting portion 6 of the upper die 43 and, in the finish forming process, the excess metal material 52 of the mounting portion 6 caused to enter into the groove portion 51 to thereby form the mounting portion 6. Owing to this, while no flasks are formed, the mounting portion 6 having a complicated shape can be formed positively. This can reduce the quantity of the metal material that to be wasted as scrap. Therefore, the yield of the material can be enhanced and thus the manufacturing cost of the outer ring (outwardly flanged metal member) 2 can be reduced. Also, since the pressing load in the forging operation is reduced by an amount corresponding to no formation of a flash, it is possible to use a press working machine of a small size. This can reduce the energy consumption to thereby reduce the running cost of the finish forming apparatus. That is, the manufacturing cost of the outer ring (outwardly flanged metal member) 2 can be reduced. The other remaining structures and operation effects of the present embodiment are similar to those of the previously described first to third embodiments.

Figure 12:
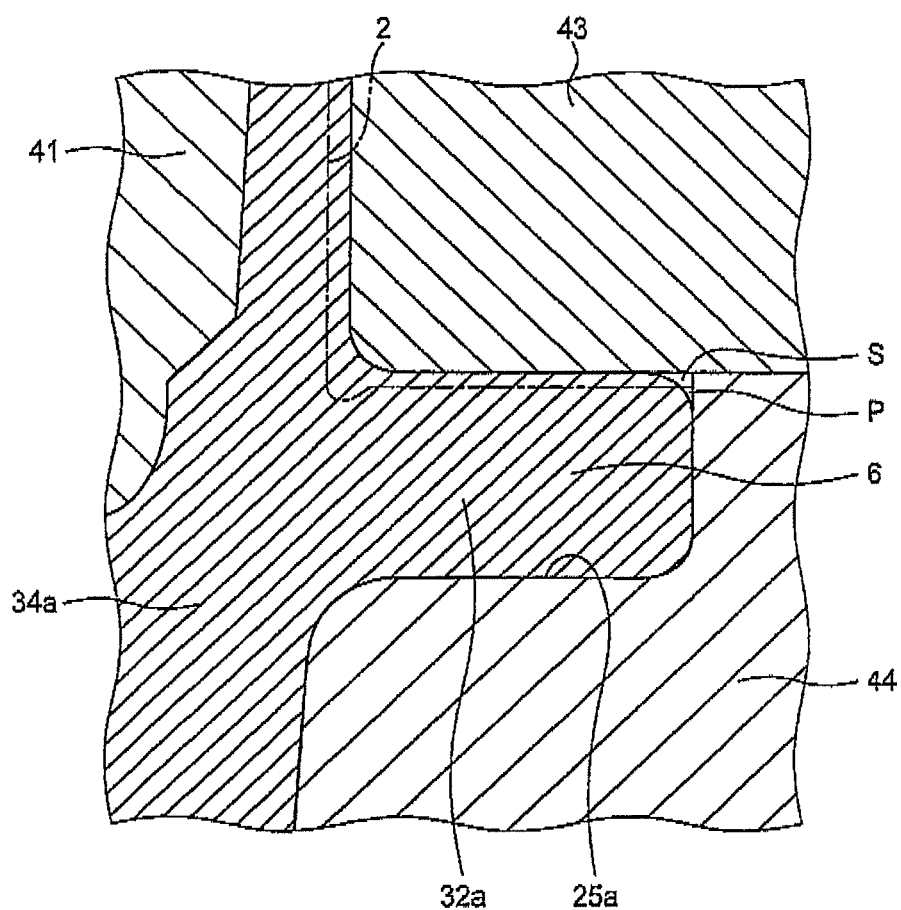
FIG. 12 is an enlarged sectional view of the main portions of a metal member, explaining a case for manufacturing an outwardly flanged metal member respectively having a complicated shape without producing a flash or extra blanks therein.

Here, when, without using the method according to the fourth embodiment, manufacturing a metal member (outer ring 2, hub body 9a) with outward flange portions (mounting portion 6, support flange 7a) respectively having a complicated shape which projects greatly outwardly in the radial direction, as shown in FIG. 12, there can be formed a space S in such corner portion as corresponds to the leading end portion of the mounting portion 6 (support flange 7a) of the flange molding cavity 32a (32), and scales or lubricants can gather in this space S. And, as such scales or lubricants remain as they are, even when given machining and grinding are executed on the blank in order to obtain the outer shape (see a one-dot chained line shown in FIG. 12) of the outer ring 2 (hub body 9a) after completed, there is generated a short metal material P in the mounting portion 6 (support flange 7a), resulting in the defective outer ring 2. In view of this, according to the second embodiment of the invention, there is generated a very small flash and, according to the fourth embodiment, the excess metal material is caused to enter into the groove portion formed in the movable die, thereby being able to manufacture a metal member including outward flange portions respectively having a complicated shape.

Fifth Embodiment

Figure 13:
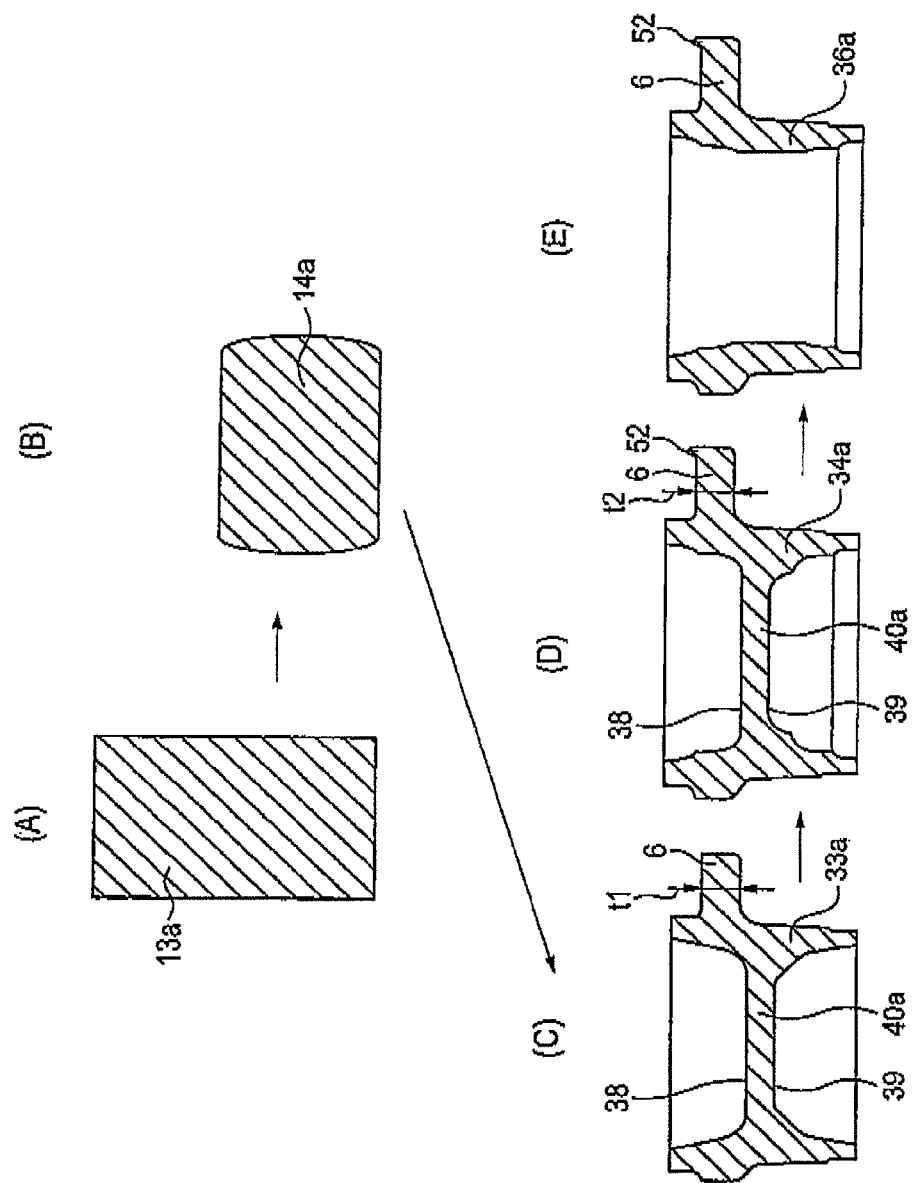
FIGS. 13A-13E are sectional views of a blank to a final intermediate work, explaining processes included in a method of manufacturing an outwardly flanged metal member according to a fifth embodiment of the invention.

Next, description will be given below of a method of manufacturing an outwardly flanged metal member according to a fifth embodiment of the invention with reference to FIGS. 13 to 15. Here, in the present embodiment, description will be given of an example thereof in which such an outer ring 2 as shown in the previously described FIG. 25 is manufactured by hot forging. Also, the parts of the present embodiment similar to or equivalent to those of the first to fourth embodiments are given the same designations in the drawings and thus the description thereof will be omitted or simplified.

According to the present embodiment, plastic working operations or blanking operations are carried out sequentially on a cylindrical metal blank 13a shown in FIG. 13(A), whereby, through a first intermediate work 14a shown in FIG. 13(B), a second intermediate work 33a shown in FIG. 13(C) and a third intermediate work 34a shown in FIG. 13(D), there is obtained a final intermediate work 36a shown in FIG. 13(E). Subsequently, given machining and grinding are executed on the final intermediate work 36a, thereby producing the outer ring 2. Here, in the present embodiment, the first intermediate work 14a corresponds to a blank according to the invention.

Next, description will be given below of processes for working the blank 13a into the final intermediate work 36a sequentially. Here, the following working operations, basically, are all carried out under a hot or warm condition. However, when forming a wheel support rolling bearing unit of a small size or the like, if possible, the working operations may also be carried out under a cold condition.

Firstly, in upsetting, as shown in FIGS. 13(A)→(B), the blank 13a is compressed in the axial direction to thereby spread the outside diameter thereof, whereby the blank 13a is worked into the first intermediate work 14a of a beer barrel shape the axially middle portion of which is expanded.

Next, in a rough forming process which is the characteristic of the present embodiment, as shown in FIGS. 13(B)→(C), the first intermediate work 14a is plastic worked into the second intermediate work 33a. This rough forming process is carried out using a rough forming apparatus shown in FIG. 14.

The present rough forming apparatus includes: a pressing punch 41 and a counter punch 42 which respectively correspond to a pair of punches; an upper die 43 corresponding to a movable die; a lower die 44 corresponding to a stationary die; a extrusion punch 45; an elastic member 31a which is interposed between the lower surface of a mounting plate 26 of the pressing punch 41 and the upper surface of the upper die 43 and fitted onto the base end portion and middle portion of the pressing punch 41; and a Belleville spring 48 disposed on the upper surface of the lower die 44 in the periphery of the pressing punch 41. In the upper end face of the lower die 44, there is formed a forming recessed portion 25a and, between the butted surfaces of the lower end face of the upper die 43 and the upper end face of the lower die 44, there is formed a flange molding cavity 32a.

According to the present embodiment, the height h1 of the flange molding cavity 32a is set such that the thickness t1 of the mounting portion 6 of the second intermediate work 33a can be slightly larger than the thickness t2 of the mounting portion 6 of the third intermediate work 34a.

Therefore, in the rough forming process according to the present embodiment, the first intermediate work 14a is plastically worked using the rough forming apparatus, whereby the thickness t1 of the mounting portion 6 of the second intermediate work 33a is set slightly larger than the thickness t2 of the mounting portion 6 of the third intermediate work 34a. Here, in the present rough forming process, it is not necessary that the metal material flow into the corner portion of the flange molding cavity 32a. Even when scales or lubricants gather in such corner portion, there is raised no problem.

Next, in a finish forming process which is the characteristic of the present embodiment, as shown in FIGS. 13(C)→(D), the second intermediate work 33a is plastically worked into the third intermediate work 34a. This finish forming process is carried out using a finish forming apparatus shown in FIG. 15.

This finish forming apparatus includes an upper die 61 corresponding to a finishing movable die, a lower die 62 corresponding to a finishing stationary die, a lower punch 63 and a extrusion punch 64.

And, according to the present embodiment, in the upper end face of the lower die 62, there is formed a forming recessed portion 25b; and, between the butted surfaces of the lower end face of the upper die 61 and the upper end face of the lower die 62, there is formed the other flange molding cavity 32b. Also, the height h2 of the other flange molding cavity 32b is set smaller than the height h1 of the flange molding cavity 32a. Further, according to the present embodiment, at such position as corresponds to the leading end portion of the mounting portion 6 of the upper die 61, there is formed a groove portion 51 for escape of the metal material.

Figure 15:
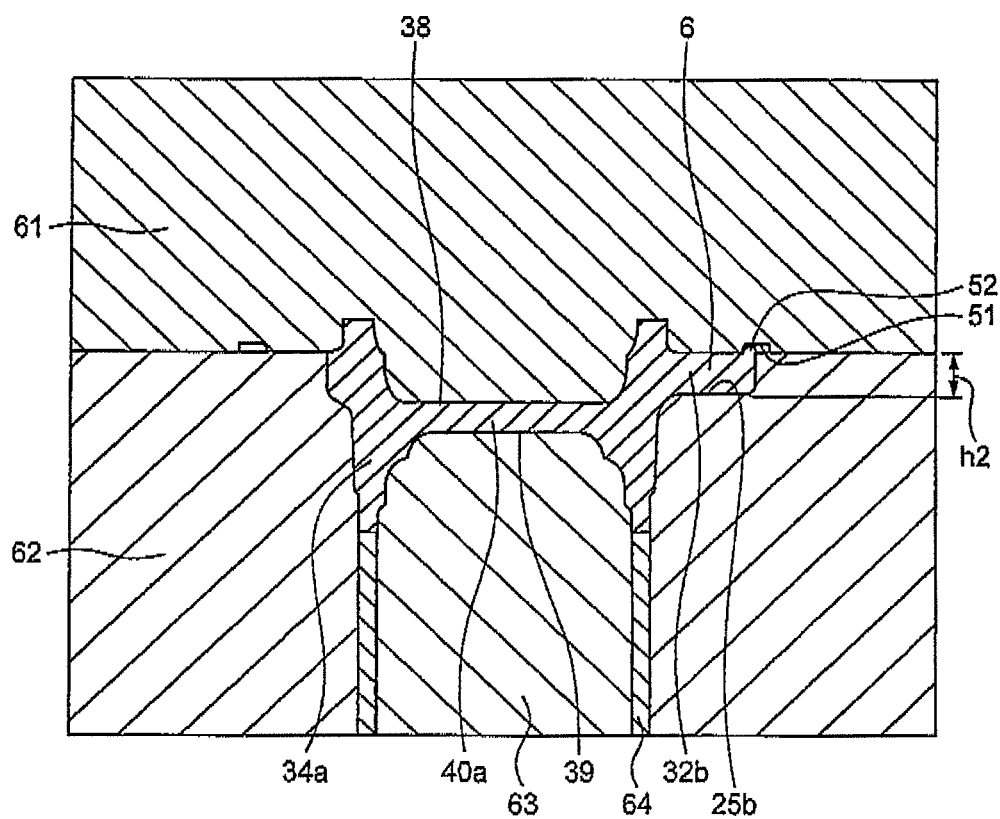

Therefore, in the finish forming process according to the present embodiment, since the second intermediate work 33a is plastically worked using the finish forming apparatus shown in FIG. 15, the mounting portion 6 of the second intermediate work 33a is compressed in the axial direction and thus the excess metal material 52 of the mounting portion 6 of the third intermediate work 34a enters into the groove portion 51 of the upper die 61, thereby finish forming the mounting portion 6 of the third intermediate work 34a. Accordingly, since the metal material goes even into the corner portion of the other flange molding cavity 32b sufficiently, even when the shape of the mounting portion 6 to be worked is complicated, without generating a flash, the mounting portion 6 can be formed positively.

Next, in the blanking process, as shown in FIGS. 13(D)→(E), a partition wall portion 40a intervening between the first and second circular recessed portions 38 and 39 of the third intermediate work 34a is blanked and removed by a press working operation or the like, whereby the third intermediate work 34a is worked into the final intermediate work 36a.

And, since the final intermediate work 36a is larger in thickness than the outer ring 2 after completed, given cutting (turning) operations and grinding operations are carried out on the final intermediate work 36a, thereby completing it as the outer ring 2. The other remaining structures and operation effects of the present embodiment are similar to those of the previously described first to fourth embodiments.

Sixth Embodiment

Figure 16:
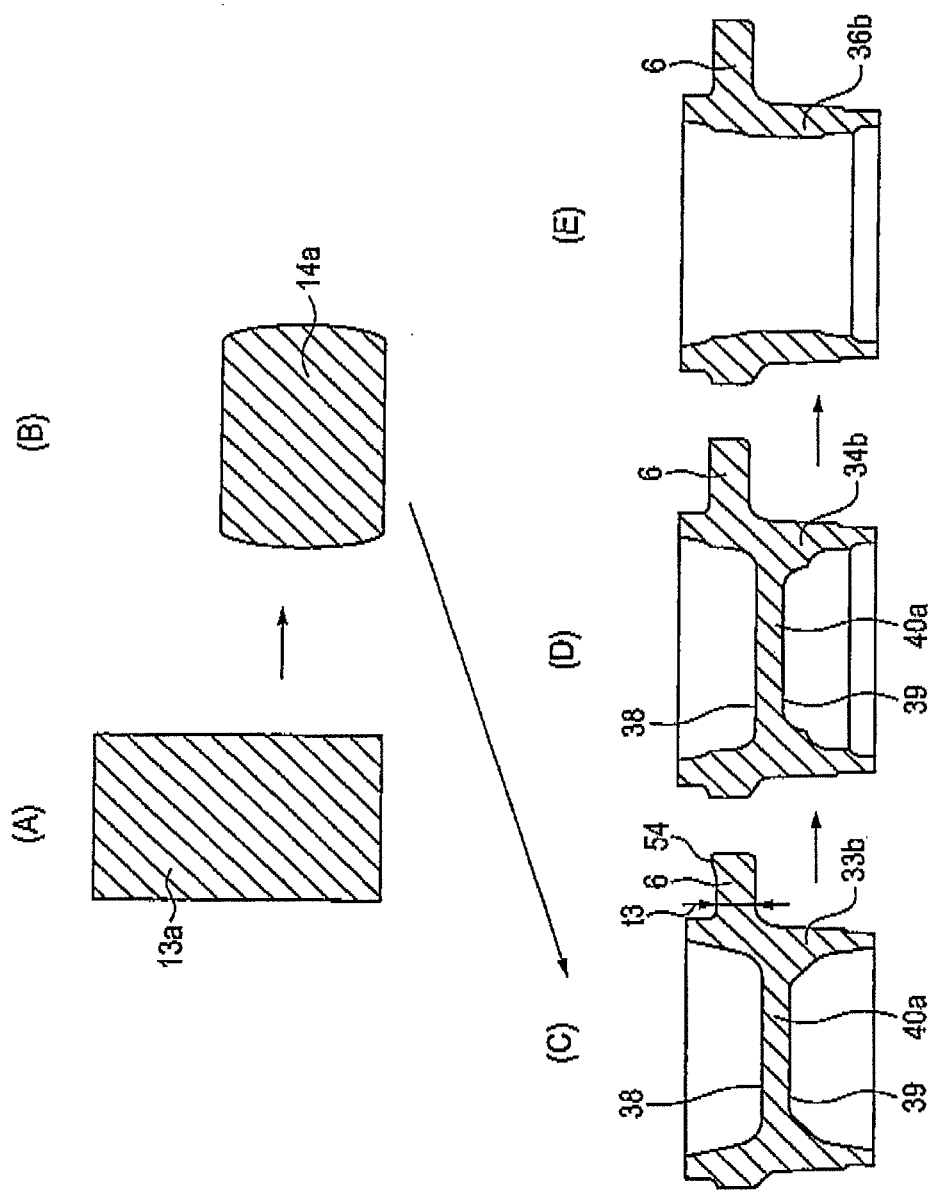
FIGS. 16A-16E are sectional views of a blank to a final intermediate work, explaining processes included in a method of manufacturing an outwardly flanged metal member according to a sixth embodiment of the invention.

Next, description will be given below of a method of manufacturing an outwardly flanged metal member according to a sixth embodiment of the invention with reference to FIGS. 16 to 18. Here, in the present embodiment, description will be given of an example thereof in which such an outer ring 2 as shown in the previously described FIG. 25 is manufactured by hot forging. Also, the parts of the present embodiment similar to or equivalent to those of the first to fifth embodiments are given the same designations in the drawings and thus the description thereof will be omitted or simplified.

According to the present embodiment, plastic working operations or blanking operations are carried out sequentially on a cylindrical metal blank 13a shown in FIG. 16(A), whereby, through a first intermediate work 14a shown in FIG. 16(B), a second intermediate work 33b shown in FIG. 16(C) and a third intermediate work 34b shown in FIG. 16(D), there is obtained a final intermediate work 36b shown in FIG. 16(E). Subsequently, given machining and grinding are executed on the final intermediate work 36b, thereby producing the outer ring 2. Here, in the present embodiment, the first intermediate work 14a corresponds to a blank according to the invention.

Next, description will be given below of processes for working the blank 13a into the final intermediate work 36b sequentially. Here, the following working operations, basically, are all carried out under a hot or warm condition. However, when forming a wheel support rolling bearing unit of a small size or the like, if possible, the working operations may also be carried out under a cold condition.

Firstly, in upsetting, as shown in FIGS. 16(A)→(B), the blank 13a is compressed in the axial direction to thereby spread the outside diameter thereof, whereby the blank 13a is worked into the first intermediate work 14a of a beer barrel shape the axially middle portion of which is expanded.

Next, in a rough forming process which is the characteristic of the present embodiment, as shown in FIGS. 16(B)→(C), the first intermediate work 14a is plastically worked into the second intermediate work 33b. This rough forming process is carried out using a rough forming apparatus shown in FIG. 17.

The present rough forming apparatus includes: a pressing punch 41 and a counter punch 42 which respectively correspond to a pair of punches; an upper die 43 corresponding to a movable die; a lower die 44 corresponding to a stationary die; a extrusion punch 45; an elastic member 31a which is interposed between the lower surface of a mounting plate 26 of the pressing punch 41 and the upper surface of the upper die 43 and fitted onto the base end portion and middle portion of the pressing punch 41; and a Belleville spring 48 disposed on the upper surface of the lower die 44 in the periphery of the pressing punch 41. In the upper end face of the lower die 44, there is formed a forming recessed portion 25a and, between the butted surfaces of the lower end face of the upper die 43 and the upper end face of the lower die 44, there is formed a flange molding cavity 32a.

At such position of the lower surface of the upper die 43 according to the present embodiment as corresponds to a mounting portion 6 serving as an outward flange portion, there is formed a groove portion 53 into which the metal material flows; and the groove portion 53 is formed to have a circular shape when it is viewed from above. In a case in which the upper and lower dies 43, 44 are put in phase with each other, the groove portion 53 may not have the circular shape but it may also be formed only at the position that corresponds to the leading end portion of the mounting portion 6.

Figure 17:
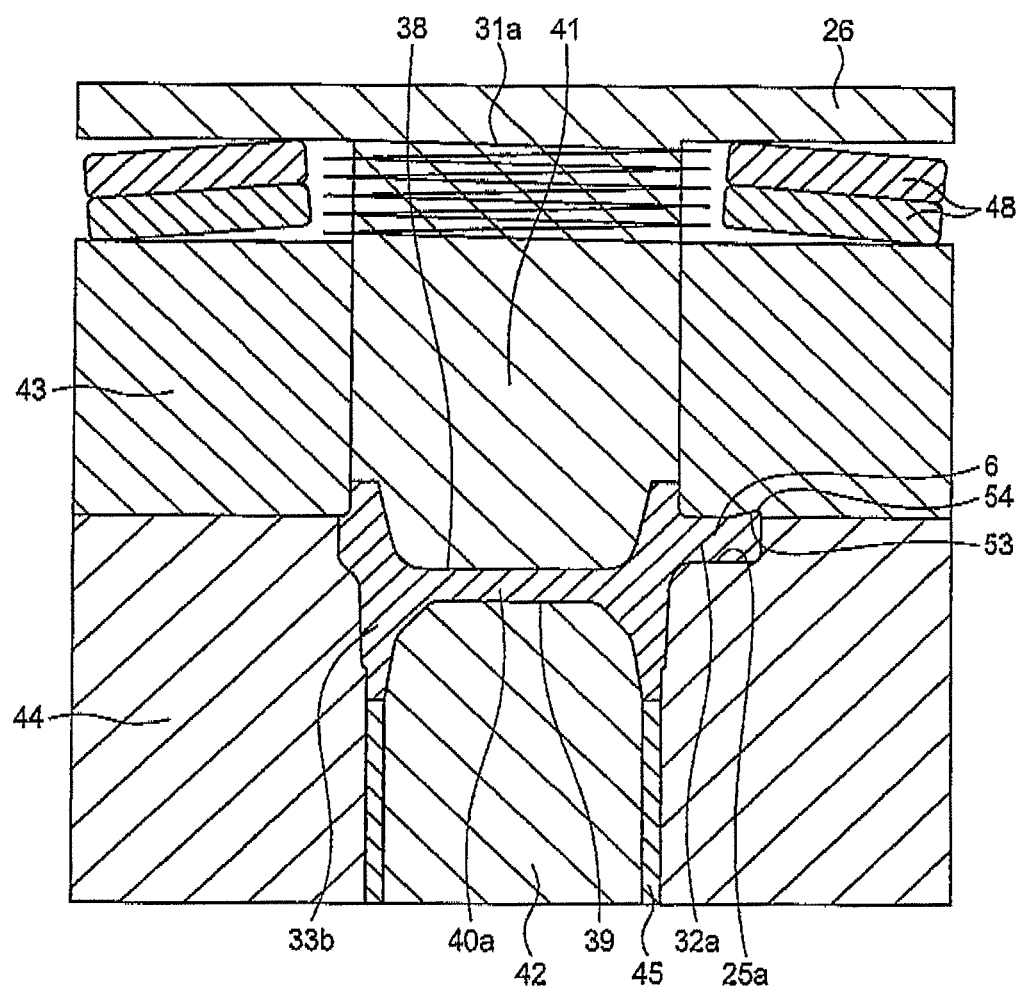

Therefore, in the rough forming process according to the present embodiment, the first intermediate work 14a is plastically worked using the rough forming apparatus shown in FIG. 17, whereby the excess metal material of the second intermediate work 33b is caused to go into the groove portion 53 of the upper die 43 to form the mounting portion 6. Thus, the mounting portion 6 of the second intermediate work 33b is formed such that the thickness thereof increases gradually outwardly in the radial direction.

Next, in a finish forming process which is the characteristic of the present embodiment, as shown in FIGS. 16(C)→(D), the second intermediate work 33b is plastically worked into the third intermediate work 34b. This finish forming process is carried out using a finish forming apparatus shown in FIG. 18.

This finish forming apparatus includes an upper die 61 corresponding to a finishing movable die, a lower die 62 corresponding to a finishing stationary die, a lower punch 63 and a extrusion punch 64.

According to the present embodiment, in the upper end face of the lower die 62, there is formed a forming recessed portion 25b; and, between the butted surfaces of the lower end face of the upper die 61 and the upper end face of the lower die 62, there is formed the other flange molding cavity 32b. Also, the height h3 of the other flange molding cavity 32b is set substantially equal to the thickness t3 of the base end portion of the mounting portion 6 of the second intermediate work 33b.

Figure 18:
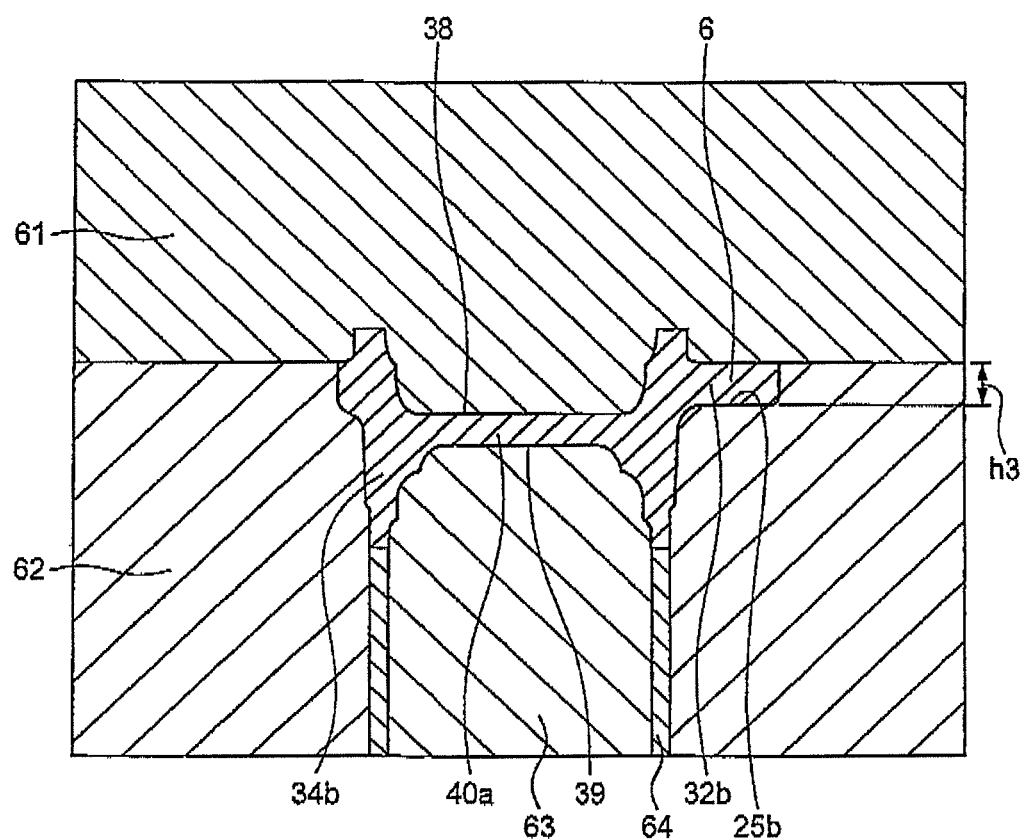

Therefore, in the finish forming process according to the present embodiment, since the second intermediate work 33b is plastically worked using the finish forming apparatus shown in FIG. 18, the mounting portion 6 of the second intermediate work 33b is compressed in the axial direction, whereby the mounting portion 6 of the third intermediate work 34b is finish formed. Accordingly, since the metal material is sufficiently exters into the corner portion of the other flange molding cavity 32b, even when the mounting portion 6 to be worked has a complicated shape, the mounting portion 6 can be formed positively without generating a flash.

Next, in a blanking process, as shown in FIG. 16(D)→(E), a partition wall portion 40a intervening between the first and second circular recessed portions 38 and 39 of the third intermediate work 34b is blanked and removed by press working or the like, whereby the third intermediate work 34b is formed into the final intermediate work 36b.

And, since the final, intermediate work 36b is larger in thickness than the outer ring 2 after completed, given cutting (turning) and grinding operations are carried out on the final intermediate work 36b to thereby complete it as the outer ring 2. The other remaining structures and operation effects of the present embodiment are similar to those of the previously described first to fifth embodiments.

Seventh Embodiment

Figure 19:
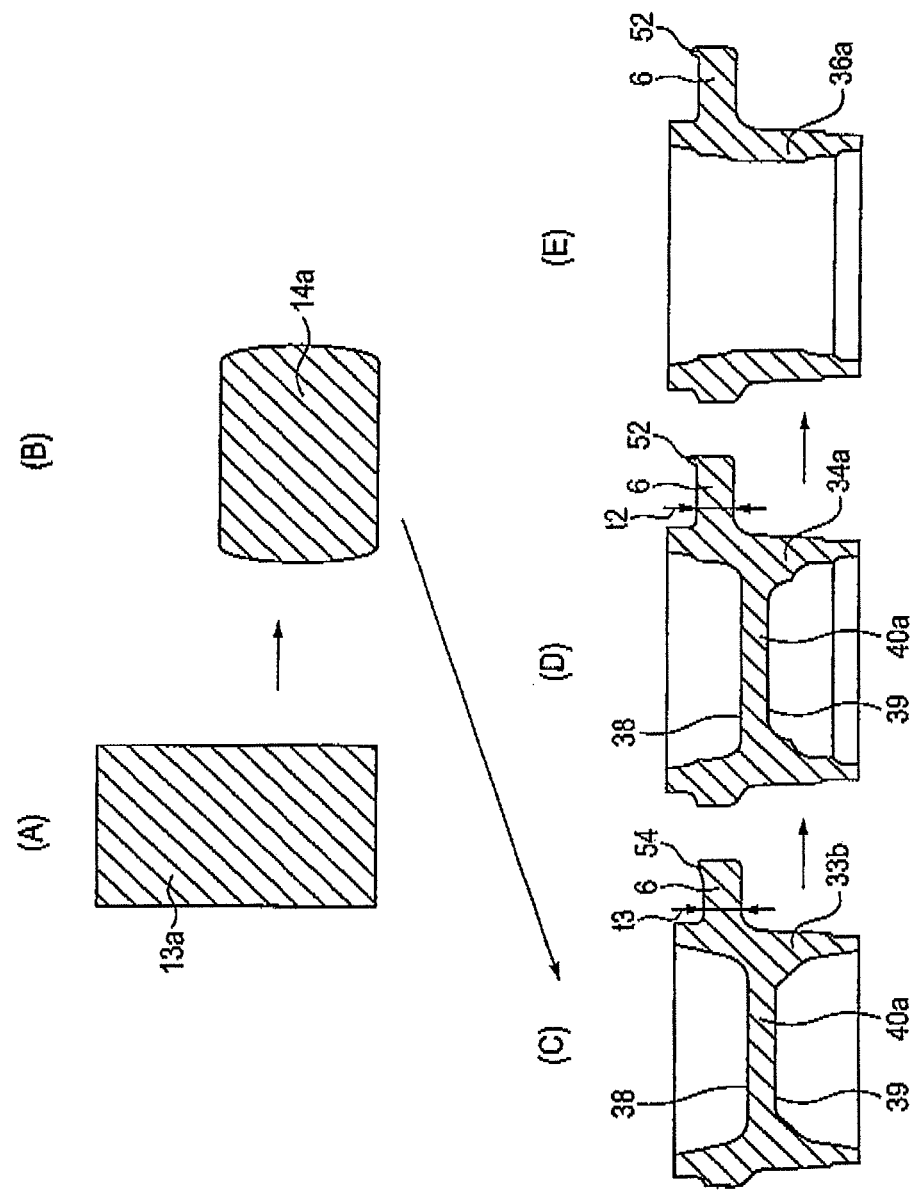
FIGS. 19A-19E are sectional views of a blank to a final intermediate work, explaining processes included in a method of manufacturing an outwardly flanged metal member according to a seventh embodiment of the invention.

Next, description will be given below of a method of manufacturing an outwardly flanged metal member according to a seventh embodiment of the invention with reference to FIG. 19. Here, in the present embodiment, description will be given of an example thereof in which such an outer ring 2 as shown in the previously described FIG. 25 is manufactured according to hot forging. Also, the parts of the present embodiment similar to or equivalent to those of the first to sixth embodiments are given the same designations in the drawings and thus the description thereof will be omitted or simplified.

According to the present embodiment, plastic working operations or blanking operations are carried out sequentially on a cylindrical metal blank 13a shown in FIG. 19(A), whereby, through a first intermediate work 14a shown in FIG. 19(B), a second intermediate work 33b shown in FIG. 19(C)

and a third intermediate work 34a shown in FIG. 19(D), there is obtained a final intermediate work 36a shown in FIG. 19(E). Subsequently, given machining and grinding are executed on the final intermediate work 36a, thereby producing the outer ring 2. Here, in the present embodiment, the first intermediate work 14a corresponds to a blank according to the invention.

Next, description will be given below of processes for working the blank 13a into the final intermediate work 36a sequentially. Here, the following working operations, basically, are all carried out under a hot or warm condition. However, when forming a wheel support rolling bearing unit of a small size or the like, if possible, the working operations may also be carried out under a cold condition.

Firstly, in upsetting, as shown in FIGS. 19(A)→(B), the blank 13a is compressed in the axial direction to thereby spread the outside diameter thereof, whereby the blank 13a is worked into the first intermediate work 14a of a beer barrel shape the axially middle portion of which is expanded.

Next, in a rough forming process which is the characteristic of the present embodiment, as shown in FIGS. 19(B)→(C), the first intermediate work 14a is plastically worked into the second intermediate work 33b. This rough forming process is carried out using the rough forming apparatus according to the sixth embodiment shown in FIG. 17.

The present rough forming apparatus includes: a pressing punch 41 and a counter punch 42 which respectively correspond to a pair of punches; an upper die 43 corresponding to a movable die; a lower die 44 corresponding to a stationary die; a extrusion punch 45; an elastic member 31a which is interposed between the lower surface of a mounting plate 26 of the pressing punch 41 and the upper surface of the upper die 43 and fitted onto the base end portion and middle portion of the pressing punch 41; and a Belleville spring 48 disposed on the upper surface of the lower die 44 in the periphery of the pressing punch 41. In the upper end face of the lower die 44, there is formed a forming recessed portion 25a and, between the butted surfaces of the lower end face of the upper die 43 and the upper end face of the lower die 44, there is formed a flange molding cavity 32a.

At such position of the lower surface of the upper die 43 according to the present embodiment as corresponds to a mounting portion 6 serving as an outward flange portion, there is formed a groove portion 53 into which the metal material flows; and the groove portion 53 is formed to have a circular shape when it is viewed from above. In a case in which the upper and lower dies 43, 44 are put in phase with each other, the groove portion 53 may not have the circular shape but it may also be formed only at the position that corresponds to the leading end portion of the mounting portion 6.

Therefore, in the rough forming process according to the present embodiment, the first intermediate work 14a is plastically worked using the rough forming apparatus shown in FIG. 17, whereby the excess metal material of the second intermediate work 33b is caused to go into the groove portion 53 of the upper die 43 to thereby form the mounting portion 6. Thus, the mounting portion 6 of the second intermediate work 33b is formed such that the thickness thereof increases gradually outwardly in the radial direction.

Next, in a finish forming process which is the characteristic of the present embodiment, as shown in FIGS. 19(C)→(D), the second intermediate work 33b is plastically worked into the third intermediate work 34a. This finish forming process is carried out using the finish forming apparatus according to the fifth embodiment shown in FIG. 15.

This finish forming apparatus includes an upper die 61 corresponding to a finishing movable die, a lower die 62 corresponding to a finishing stationary die, a lower punch 63 and a extrusion punch 64.

According to the present embodiment, in the upper end face of the lower die 62, there is formed a forming recessed portion 25b; and, between the butted surfaces of the lower end face of the upper die 61 and the upper end face of the lower die 62, there is formed the other flange molding cavity 32b. Also, the height h2 of the other flange molding cavity 32b is set substantially equal to the thickness t3 of the base end portion of the mounting portion 6 of the second intermediate work 33b. Further, according to the present embodiment, at such position of the lower surface of the upper die 61 as corresponds to the leading end portion of the mounting portion 6, there is formed a groove portion 51 to allow the metal material to escape.

Therefore, in the finish forming process according to the present embodiment, since the second intermediate work 33b is plastically worked using the finish forming apparatus shown in FIG. 15, the mounting portion 6 of the second intermediate work 33b is compressed in the axial direction and thus the excess metal material 52 of the mounting portion 6 of the third intermediate work 34a flows into the groove portion 51 of the upper die 61, thereby finish forming the mounting portion 6 of the third intermediate work 34a. Accordingly, since the metal material goes even into the corner portion of the other flange molding cavity 32b sufficiently, even when the mounting portion 6 to be worked has a complicated shape, the mounting portion 6 can be formed positively without generating a flash.

Next, in the blanking process, as shown in FIGS. 19(D)→(E), a partition wall portion 40a intervening between the first and second circular recessed portions 38 and 39 of the third intermediate work 34a is blanked and removed by press working or the like, whereby the third intermediate work 34a is worked into the final intermediate work 36a.

Since the final intermediate work 36a is larger in thickness than the outer ring 2 after completed, given cutting (turning) operations and grinding operations are carried out on the final intermediate work 36a, thereby completing it as the outer ring 2. The other remaining structures and operation effects of the present embodiment are similar to those of the previously described first to sixth embodiments.

Eighth Embodiment

Figure 20:
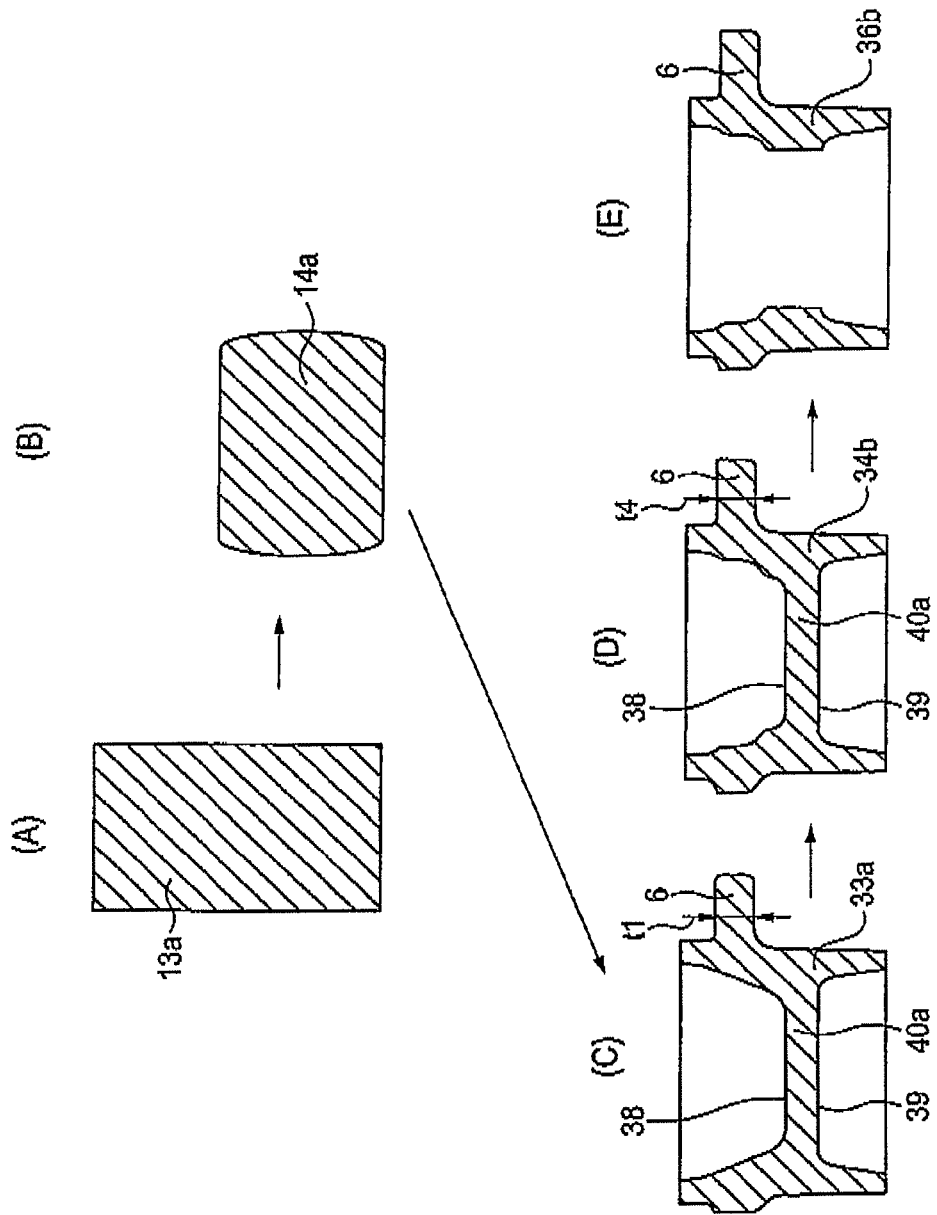
FIGS. 20A-20E are sectional views of a blank to a final intermediate work, explaining processes included in a method of manufacturing an outwardly flanged metal member according to an eighth embodiment of the invention.
Figure 21:
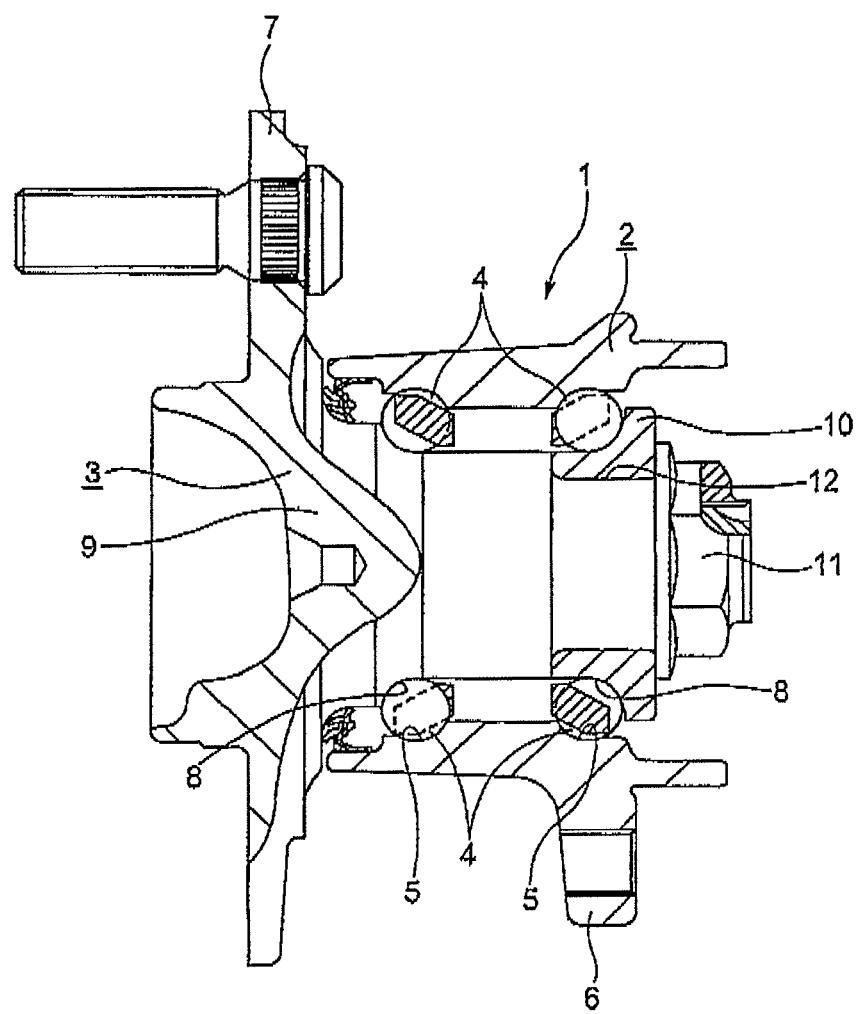
FIG. 21 is a sectional view of an example of a wheel support rolling bearing unit including a hub body and an outer ring serving as an outwardly flanged metal member which can be manufactured according to the manufacturing method of the invention.
Figure 22:
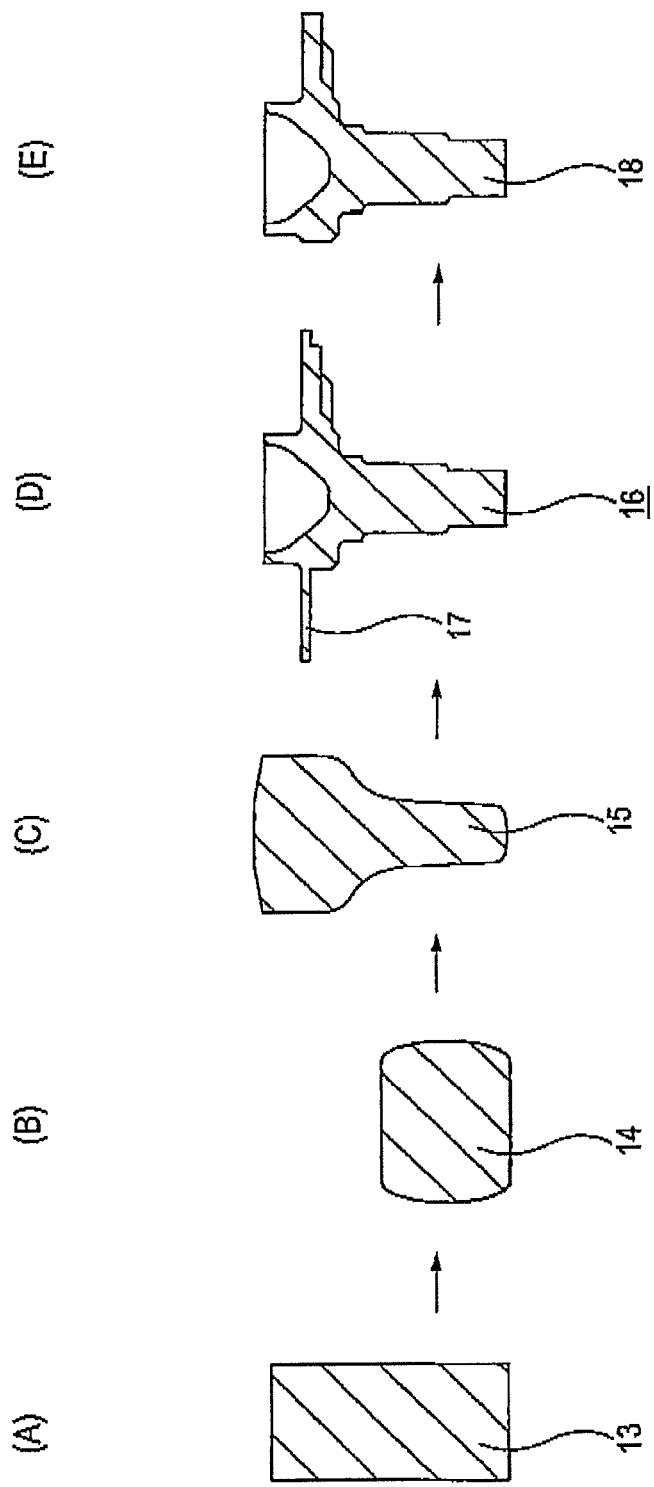

Next, description will be given below of a method of manufacturing an outwardly flanged metal member according to an eighth embodiment of the invention with reference to FIG. 20. Here, in the present embodiment, description will be given of an example thereof in which such an outer ring 2 as shown in the previously described FIG. 25 is manufactured by hot forging. Also, the parts of the present embodiment similar to or equivalent to those of the first to sixth embodiments are given the same designations in the drawings and thus the description thereof will be omitted or simplified.

According to the present embodiment, plastic working operations or blanking operations are carried out sequentially on a cylindrical metal blank 13a shown in FIG. 20(A), whereby, through a first intermediate work 14a shown in FIG. 20(B), a second intermediate work 33a shown in FIG. 20(C) and a third intermediate work 34b shown in FIG. 20(D), there is obtained a final intermediate work 36b shown in FIG. 20(E) are produced sequentially. Subsequently, given machining and grinding are executed on the final intermediate work 36b, thereby producing the outer ring 2. Here, in the present embodiment, the first intermediate work 14a corresponds to a blank according to the invention.

Next, description will be given below of processes for working the blank 13a into the final intermediate work 36b sequentially. Here, the following working operations, basically, are all carried out under a hot or warm condition. However, when forming a wheel support rolling bearing unit of a small size or the like, if possible, the working operations may also be carried out under a cold condition.

Firstly, in upsetting, as shown in FIGS. 20(A)→(B), the blank 13a is compressed in the axial direction to thereby spread the outside diameter thereof; whereby the blank 13a is worked into the first intermediate work 14a of a beer barrel shape the axially middle portion of which is expanded.

Next, in a rough forming process which is the characteristic of the present embodiment, as shown in FIGS. 20(B)→(C), the first intermediate work 14a is plastically worked into the second intermediate work 33a. This rough forming process is carried out using the rough forming apparatus according to the fifth embodiment shown in FIG. 14.

The present rough forming apparatus includes: a pressing punch 41 and a counter punch 42 which respectively correspond to a pair of punches; an upper die 43 corresponding to a movable die; a lower die 44 corresponding to a stationary die; a extrusion punch 45; an elastic member 31a which is interposed between the lower surface of a mounting plate 26 of the pressing punch 41 and the upper surface of the upper die 43 and fitted onto the base end portion and middle portion of the pressing punch 41; and a Belleville spring 48 disposed on the upper surface of the lower die 44 in the periphery of the pressing punch 41. In the upper end face of the lower die 44, there is formed a forming recessed portion 25a and, between the butted surfaces of the lower end face of the upper die 43 and the upper end face of the lower die 44, there is formed a flange molding cavity 32a.

The height h1 of the flange molding cavity 32a is set such that the thickness t1 of the mounting portion 6 of the second intermediate work 33a can be slightly larger than the thickness t4 of the mounting portion 6 of the third intermediate work 34b.

Figure 14:
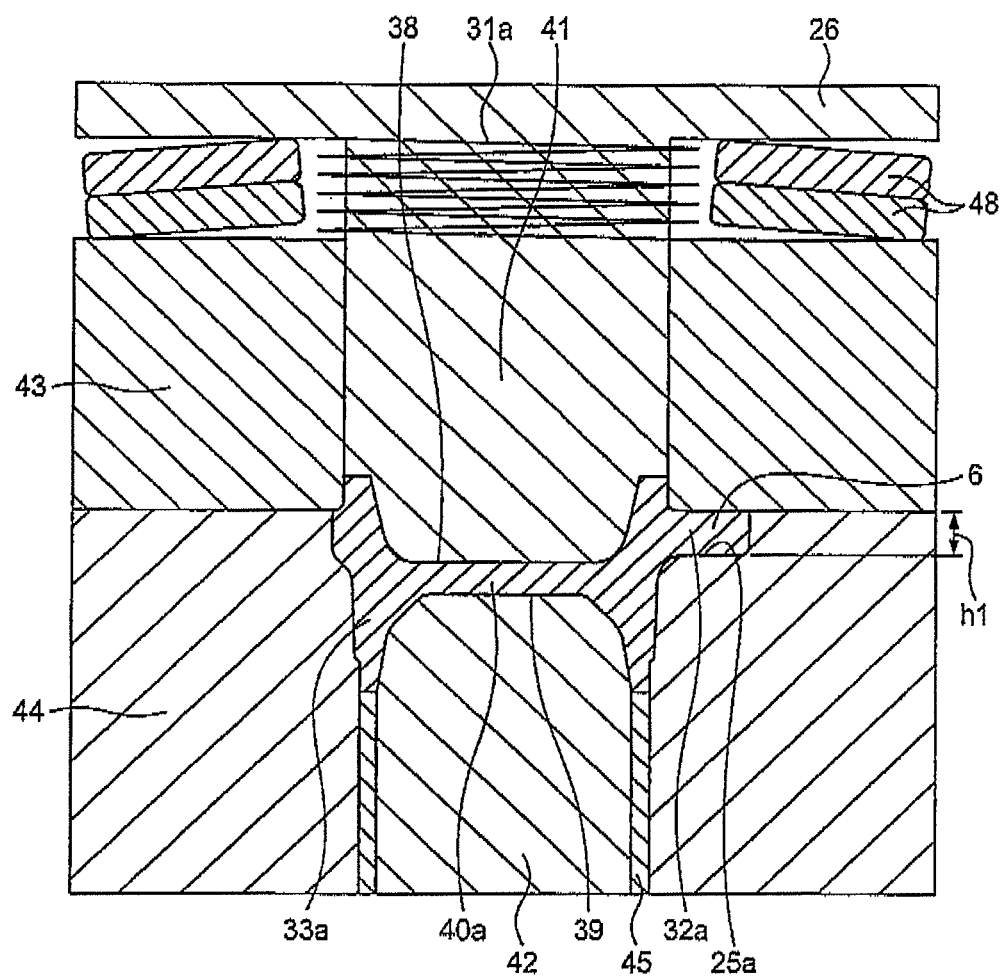

Therefore, in the rough forming process according to the present embodiment, the first intermediate work 14a is plastically worked using the rough forming apparatus shown in FIG. 14, whereby the thickness t1 of the mounting portion 6 of the second intermediate work 33a is set slightly larger than the thickness t4 of the mounting portion 6 of the third intermediate work 34b. Here, in the present rough forming process, it is not necessary that the metal material flows into the corner portion of the flange molding cavity 32a. Thus, there is no problem even when scales or lubricants gather in such corner portion.

Next, in a finish forming process which is the characteristic of the present embodiment, as shown in FIGS. 20(C)→(D), the second intermediate work 33a is plastically worked into the third intermediate work 34b. This finish forming process is carried out using the finish forming apparatus according to the sixth embodiment shown in FIG. 18.

This finish forming apparatus includes an upper die 61 corresponding to a finishing movable die, a lower die 62 corresponding to a finishing stationary die, a lower punch 63 and a extrusion punch 64.

According to the present embodiment, in the upper end face of the lower die 62, there is formed a forming recessed portion 25b; and, between the butted surfaces of the lower end face of the upper die 61 and the upper end face of the lower die 62, there is formed the other flange molding cavity 32b. Also, the height h3 of the other flange molding cavity 32b is set smaller than the height h1 of the flange molding cavity 32a.

Therefore, in the finish forming process according to the present embodiment, since the second intermediate work 33a is plastically worked using the finish forming apparatus shown in FIG. 18, the mounting portion 6 of the second intermediate work 33a is compressed in the axial direction, whereby the mounting portion 6 of the third intermediate work 34b is finish formed. Accordingly, since the metal material goes even into the corner portion of the other flange molding cavity 32b sufficiently, even when the mounting portion 6 to be worked has a complicated shape, the mounting portion 6 can be formed positively without generating a flash.

Next, in the blanking process, as shown in FIGS. 20(D)→(E), a partition wall portion 40a intervening between the first and second circular recessed portions 38 and 39 of the third intermediate work 34b is blanked and removed by a press working operation or the like, whereby the third intermediate work 34b is worked into the final intermediate work 36b.

Since the final intermediate work 36b is larger in thickness than the outer ring 2 after completed, given cutting (turning) operations and grinding operations are carried out on the final intermediate work 36b, thereby completing it as the outer ring 2. The other remaining structures and operation effects of the present embodiment are similar to those of the previously described first to sixth embodiments.

While the present invention has been described in detail with reference to certain embodiments thereof, it is apparent to those skilled in the art that various changes and modifications can be made therein without departing from the spirit and scope of the invention. The present application is based on Japanese Patent Application (Patent Application No. 2008-017166) filed on Jan. 29, 2008 and Japanese Patent Application (Patent Application No. 2008-224385) filed on Sep. 2, 2008, the entire contents of which are incorporated herein by reference.

The invention claimed is:

1. A method of manufacturing an outwardly flanged metal member comprising outward flange portions protruding radially outwardly from a plurality of positions along a circumferential direction on one side of an outer peripheral surface in an axial direction, the method comprising:

providing a die and a punch, the die comprising a stationary die and a movable die to which a first elastic force toward the stationary die is applied, at least one of the stationary die and the movable die forming flange molding cavities adapted to work the outward flange portions, the punch being movable through inside the movable die; and plastically working, while surrounding a periphery of a metal blank by the die and butting a distal face of the movable die and a distal face of the stationary die, an axial end face of the blank by pressing the axial end face with the punch under a warm or hot condition, wherein the plastically working comprises forming the outward flange portions by filling the flange molding cavities with a portion of the blank, wherein a magnitude of the first elastic force that presses the movable die toward the stationary die is set such that, while the movable die is butted against the stationary die along with a downward movement of the punch, the movable die cannot be prevented from floating up from the stationary die when the flange molding cavities are filled with the blank, and wherein, until the blank enters partway into the flange molding cavities, the movable die is butted against the stationary die by in addition to the first elastic force, a friction force acting on a contact portion between an outer peripheral surface of the blank and an inner peripheral surface of the movable die, and without using a second elastic force of an elastic member disposed around the punch, and subsequently, in a course of filling the flange molding cavities with the blank, the butting of the movable die against the stationary die is maintained by, in addition to the first elastic force and the friction force, the second elastic force of the elastic member disposed around the punch, the second elastic force being larger than the first elastic force.

2. The method of manufacturing the outwardly flanged metal member as set forth in claim 1, wherein the elastic member is a Belleville spring.

3. The method of manufacturing the outwardly flanged metal member as set forth in claim 1, wherein the outwardly flanged metal member is a hub body of a wheel support rolling bearing unit having, on a portion of the outer peripheral surface shifted from the outward flange portions in the axial direction, an inner ring raceway and a small diameter step portion onto which a separate piece of inner ring is fitted, and wherein the stationary die with a cavity adapted to form the inner ring raceway and the small diameter step portion is used.

4. The method of manufacturing the outwardly flanged metal member as set forth in claim 1, wherein the outwardly flanged metal member is an outer ring of a wheel support rolling bearing unit having double rows of outer ring raceways on an inner peripheral, surface, and the method comprises:

plastically working the blank by pressing from both sides in the axial direction with a pair of punches to form axial end portions of the blank into a cylindrical portion having an inner peripheral surface shape that correspond to outer peripheral surface shapes of the pair of punches, and simultaneously to form the outward flange portions on the outer peripheral surface of the cylindrical portion.

5. The method of manufacturing the outwardly flanged metal member as set forth in claim 1, wherein the movable die comprises a groove portion formed at positions corresponding to distal end portions of the outward flange portions to allow the blank to escape, and wherein the plastically working comprises forming the outward flange portions by causing excess blanks of the outward flange portions to enter into the groove portion.

6. The method of manufacturing the outwardly flanged metal member as set forth in claim 5, wherein the groove portion is formed in a circular shape.

7. The method of manufacturing the outwardly flanged metal member as set forth in claim 1, wherein the providing comprises further providing a finishing die having a fishing stationary die and a finishing movable die, the finishing movable die a having groove portion at positions corresponding to distal end portions of the outward flange portions to allow the blank to escape, at least one of the finishing stationary die and the finishing movable die forming other flange molding cavities adapted to finish form the outward flange portions, and the method comprises:

finish forming the outward flange portions by pressing the blank formed with the outward flange portions using the finishing die to cause excess blanks of the outward flange portions to enter the groove portion.

8. The method of manufacturing the outwardly flanged metal member as set forth in claim 7, wherein the groove portion is formed in a circular shape.

9. The method of manufacturing the outwardly flanged metal member as set forth in claim 1, wherein the providing comprises further providing a: finishing die having a fishing stationary die and a finishing movable die, at least one of the finishing stationary die and the finishing movable die forming other flange molding cavities adapted to finish form the outward flange portions, and the method comprises:

finish forming the outward flange portions by pressing the blank formed with the outward flange portions using the finishing die to compress the outward flange portions in a thickness direction.

\* \* \* \* \*